S. E. CARLIN.
CALCULATING MACHINE.
APPLICATION FILED MAR. 4, 1910.
1,274,136.
Patented July 30, 1918.
13 SHEETS—SHEET 1.
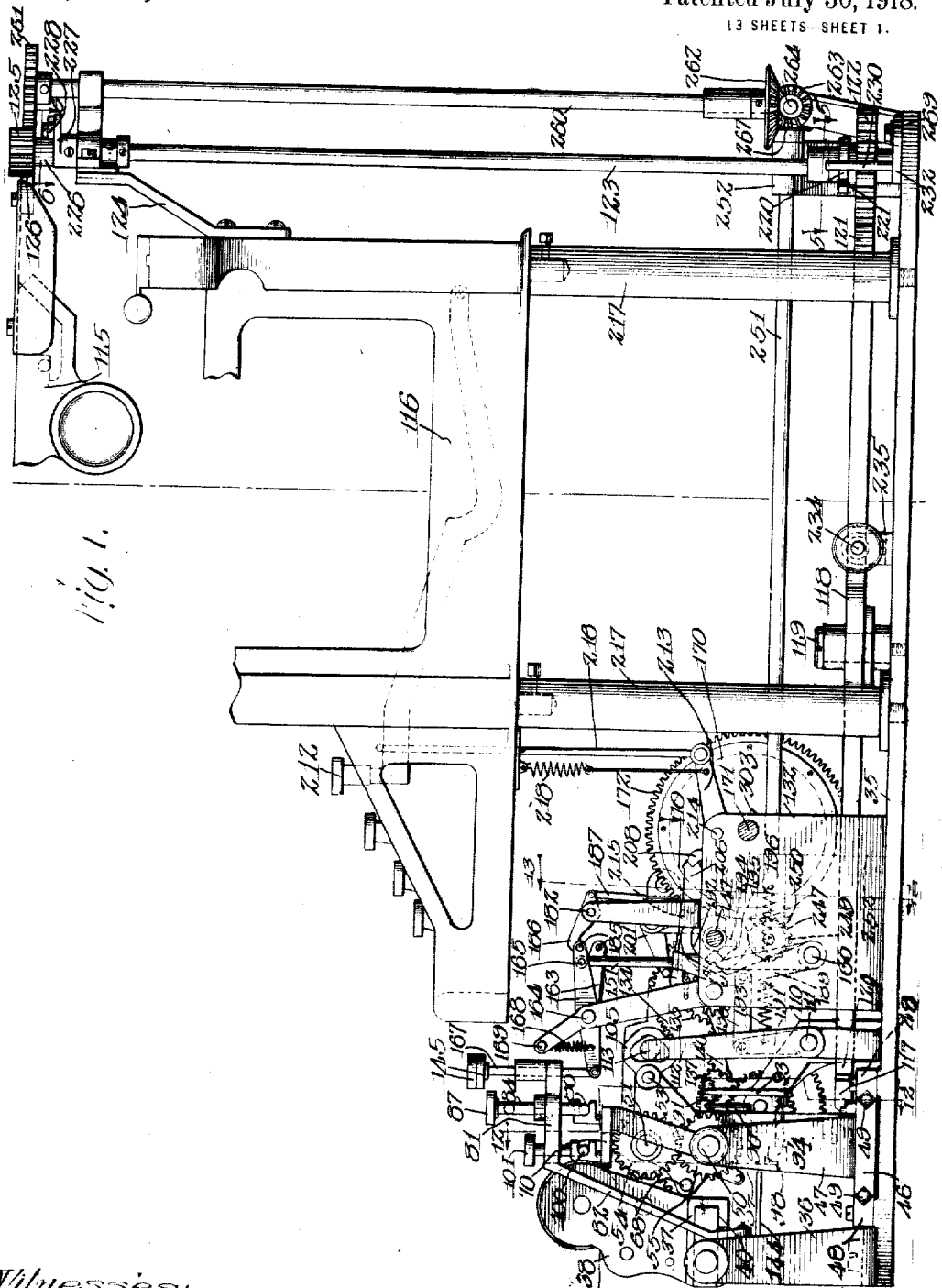

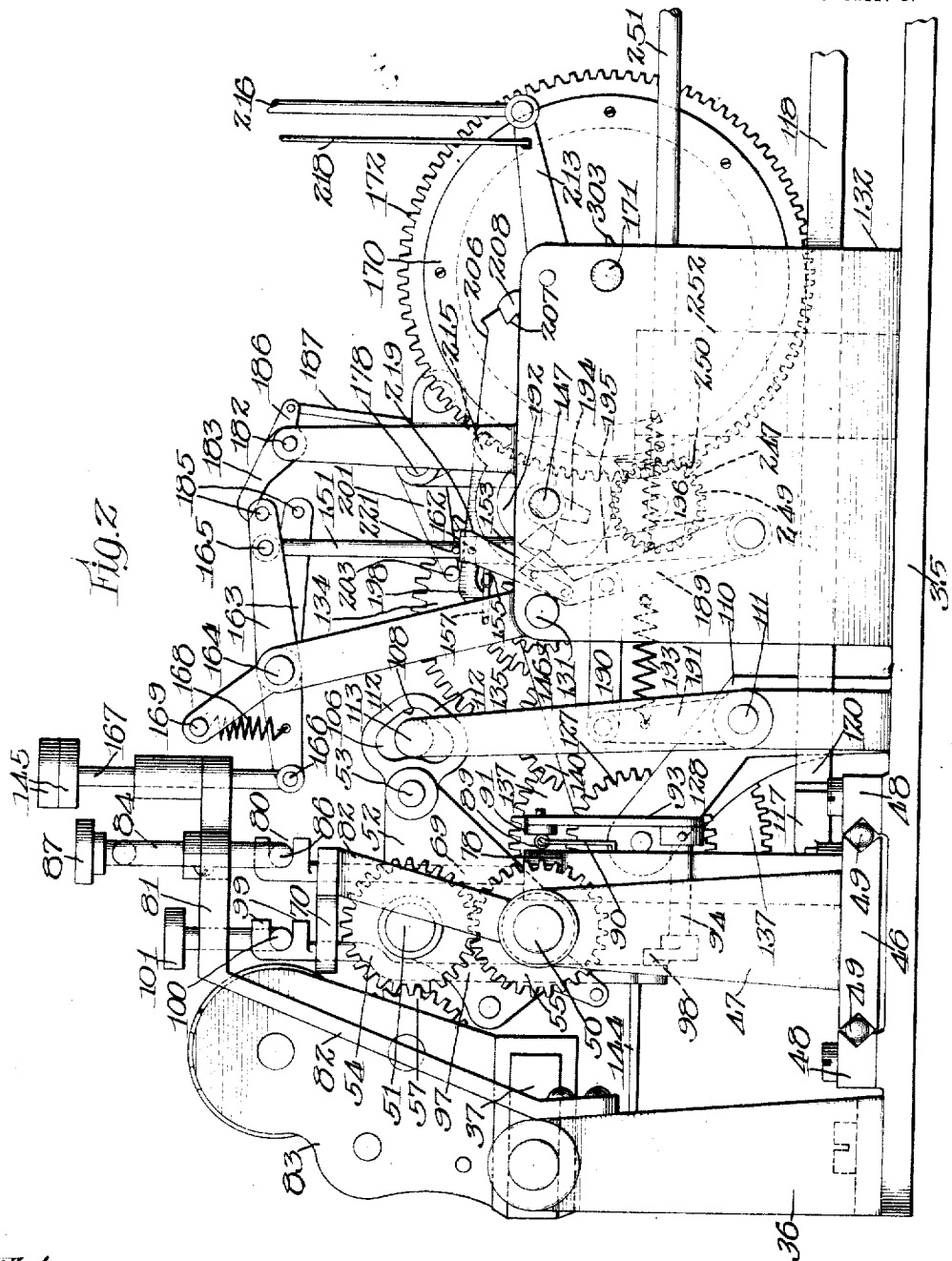

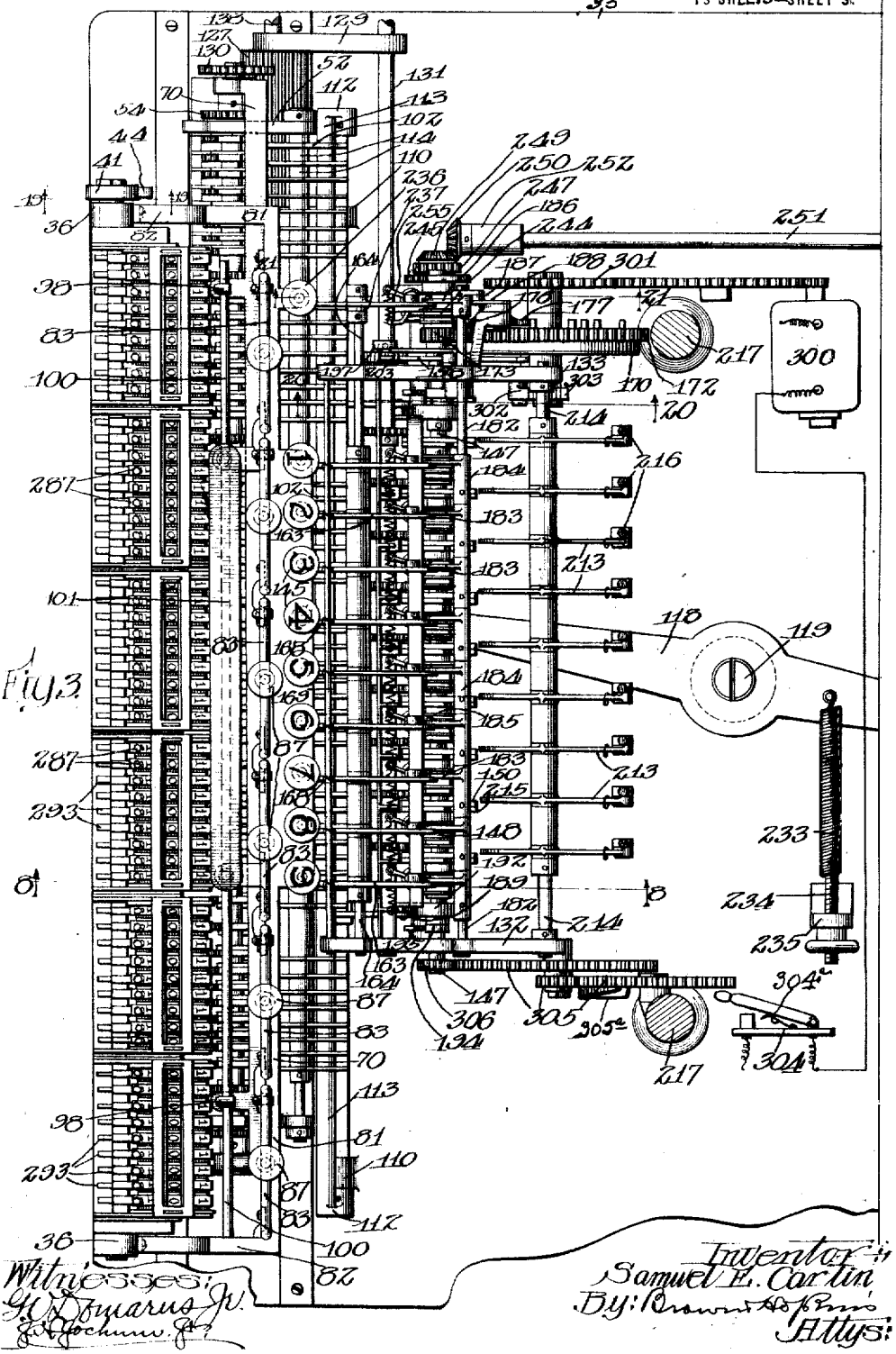

S. E. CARLIN.
CALCULATING MACHINE.
APPLICATION FILED MAR. 4, 1910.
1,274,136.
Patented July 30, 1918.
13 SHEETS—SHEET 4.
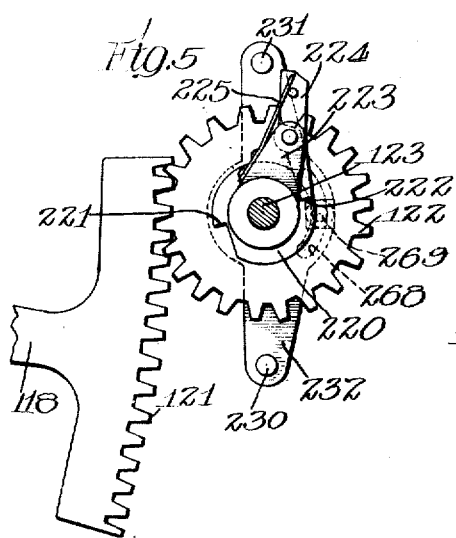
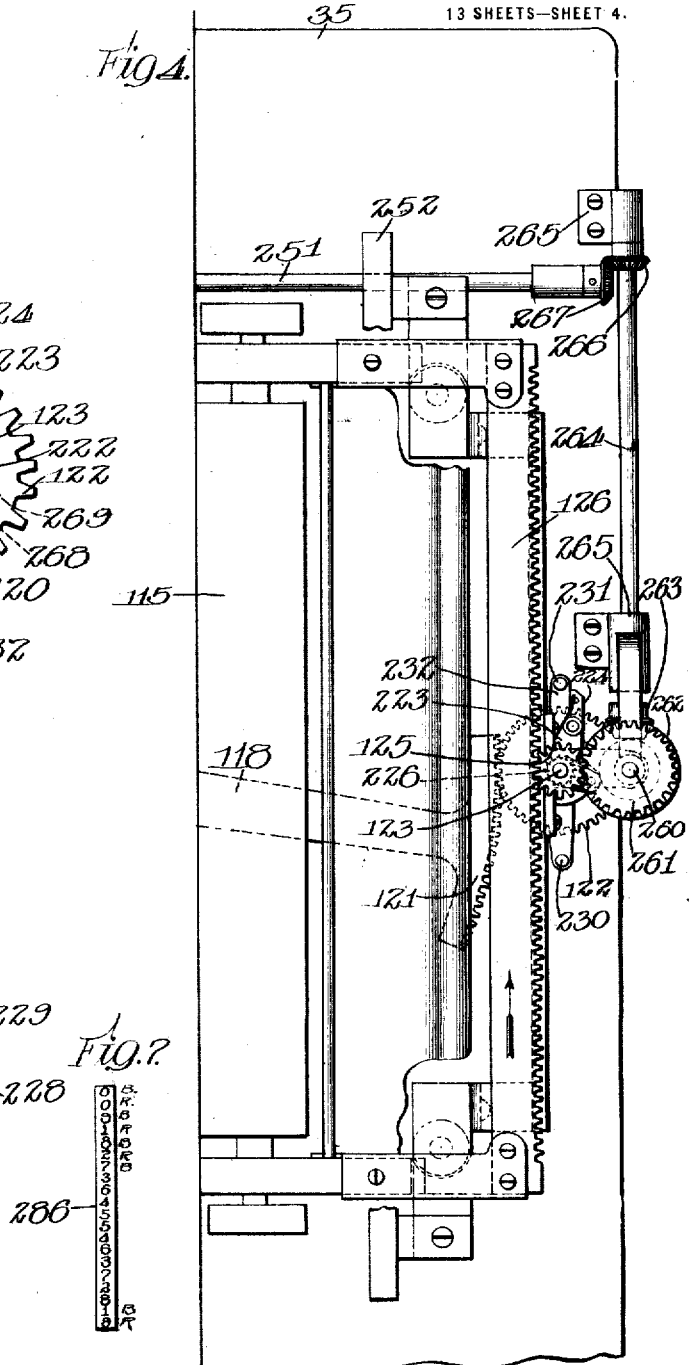
Witnesses:
Inventor:
Samuel E. Carlin
By Brown Hopkins
Attys.

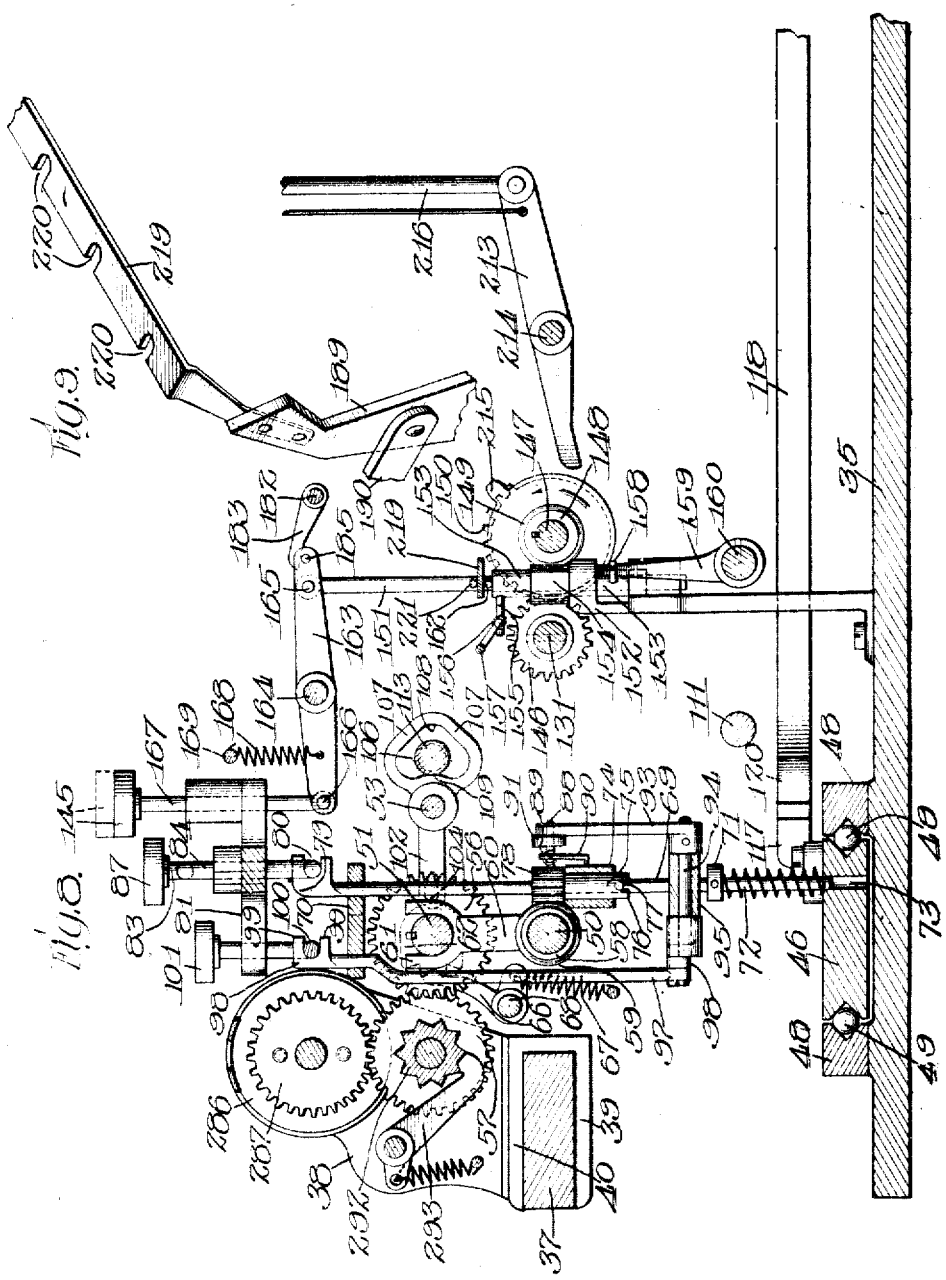

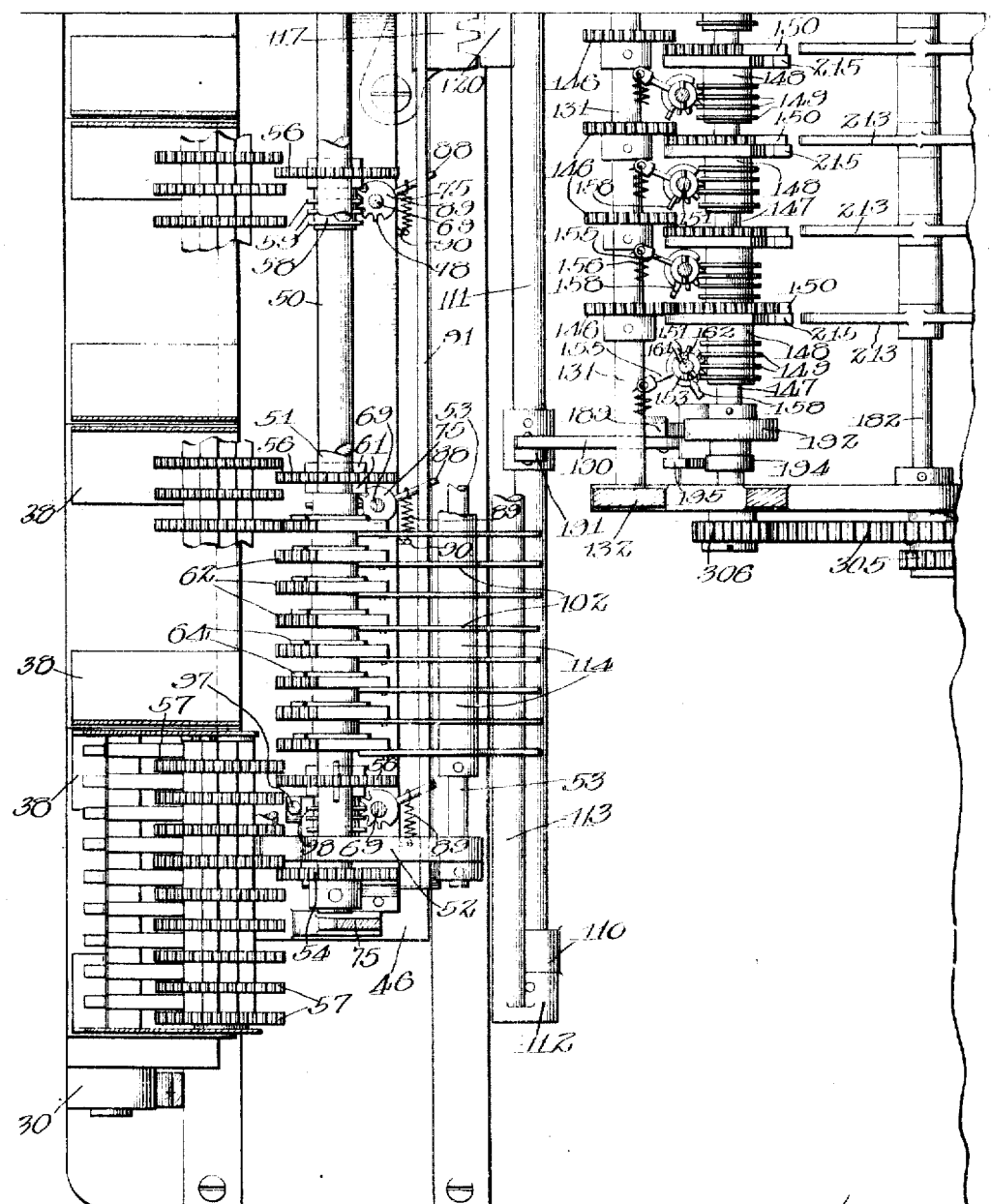

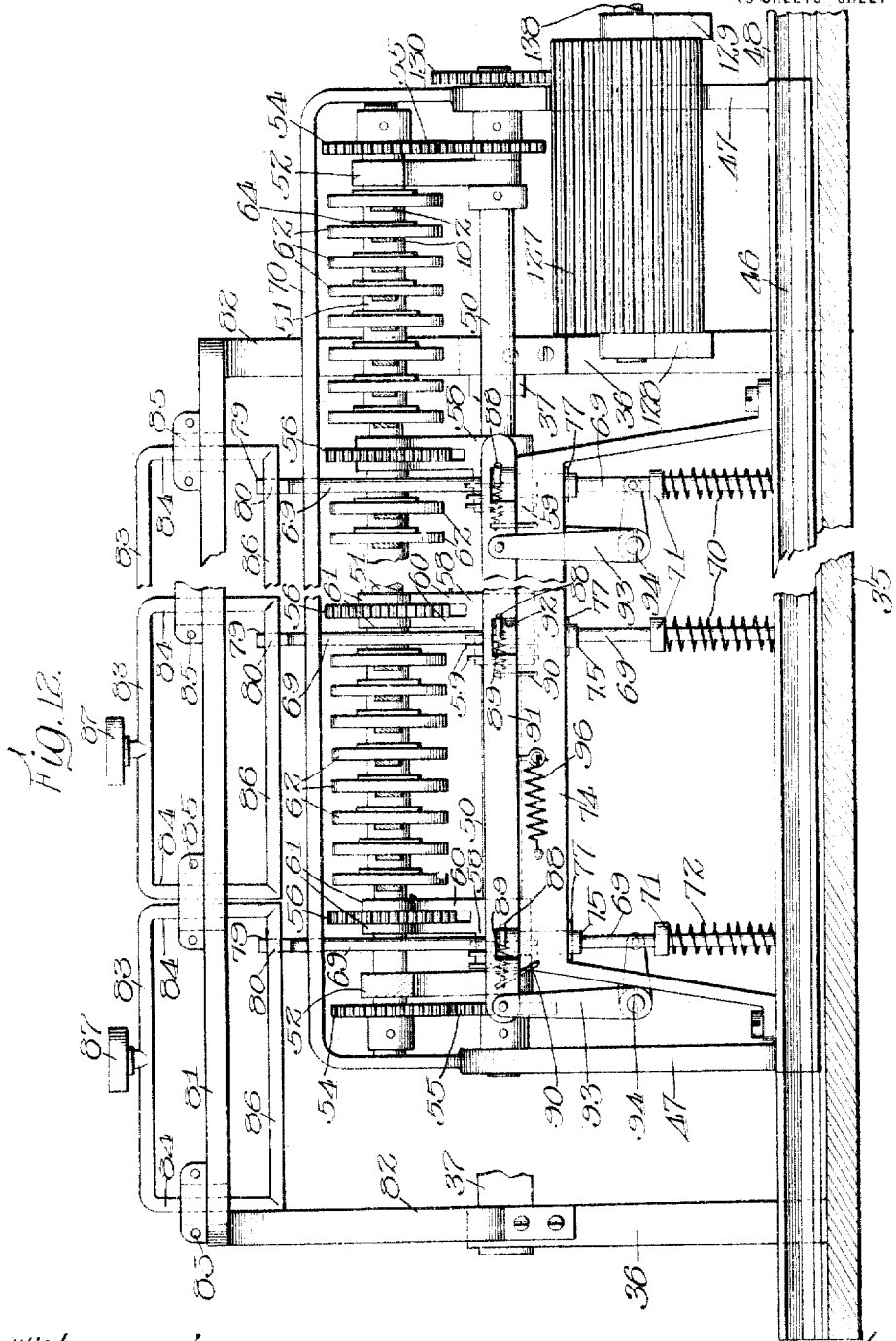

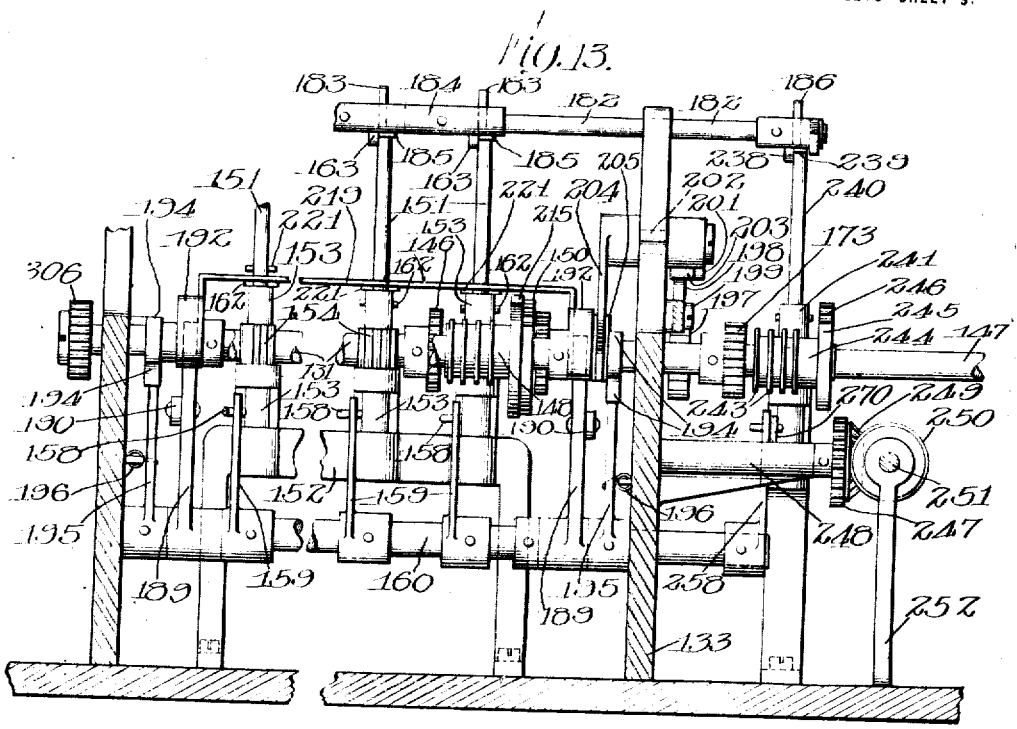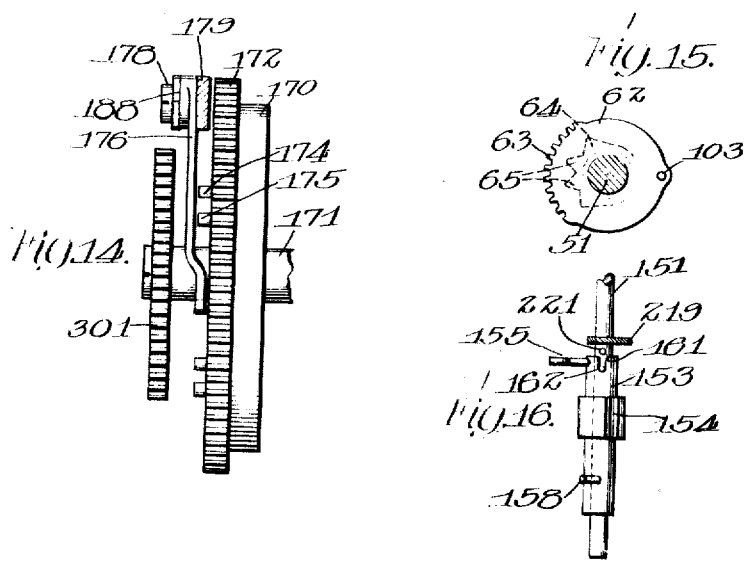

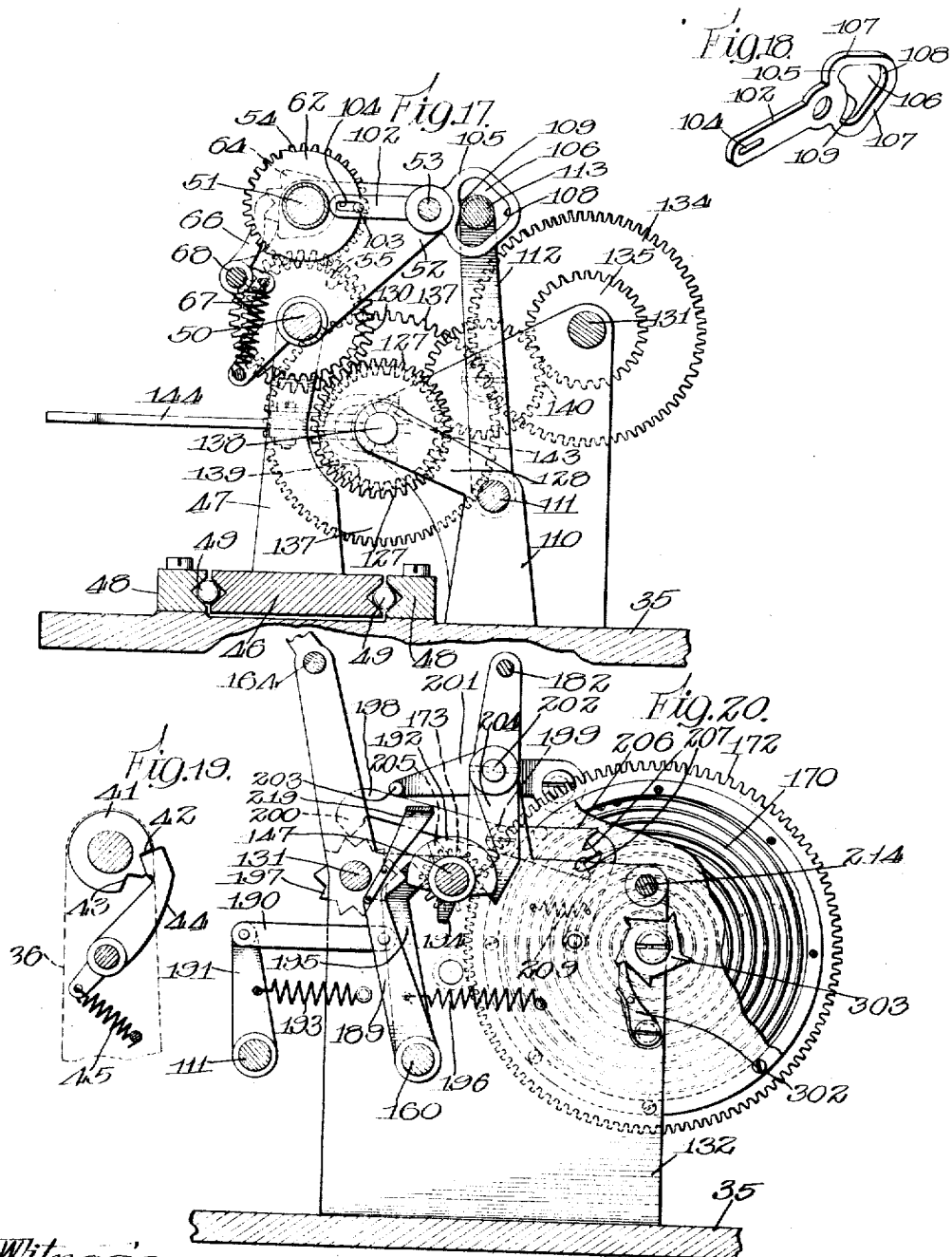

S. E. CARLIN.
CALCULATING MACHINE.
APPLICATION FILED MAR. 4, 1910.
1,274,136.
Patented July 30, 1918.
13 SHEETS—SHEET 11.
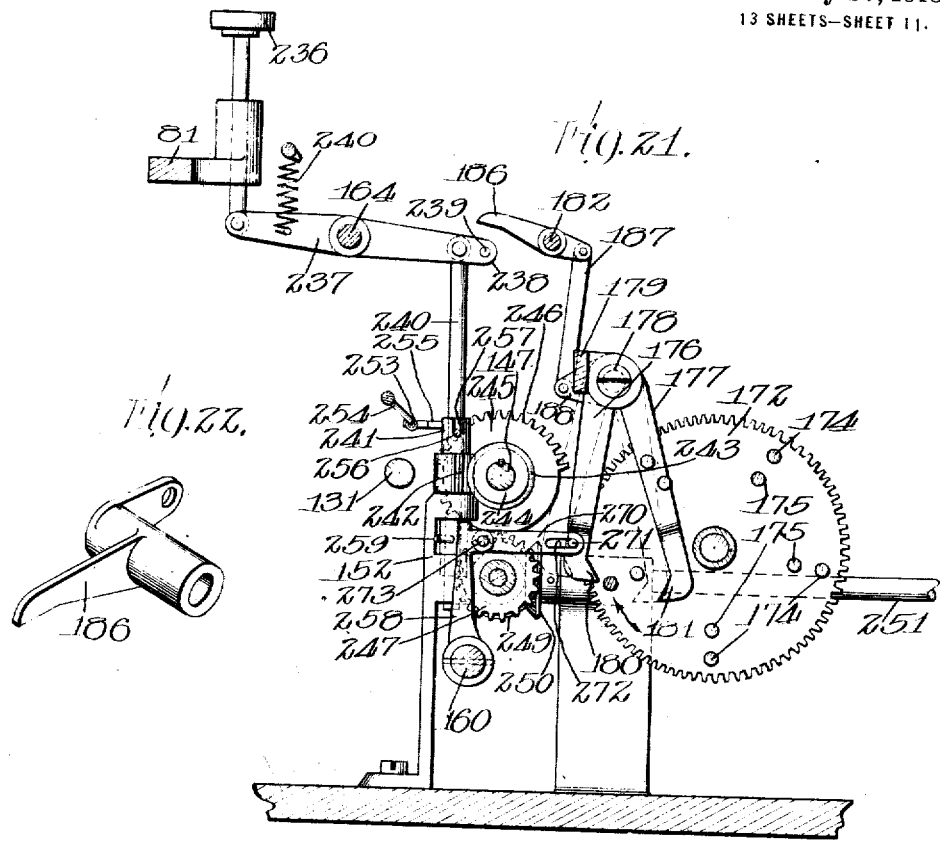
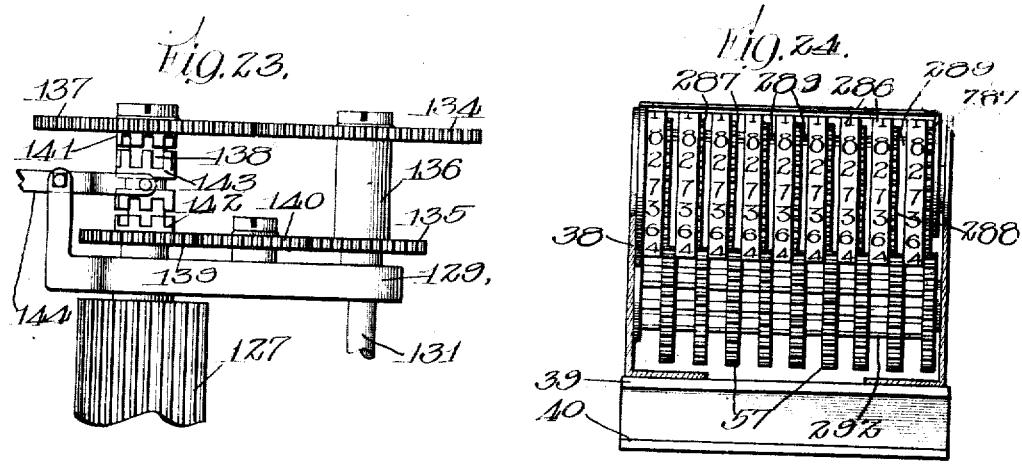
Witnesses:
G. H. Demaris Jr.
J. H. Jochum Jr.
Inventor:
Samuel E. Carlin
By Brown Hopkins
Attys.

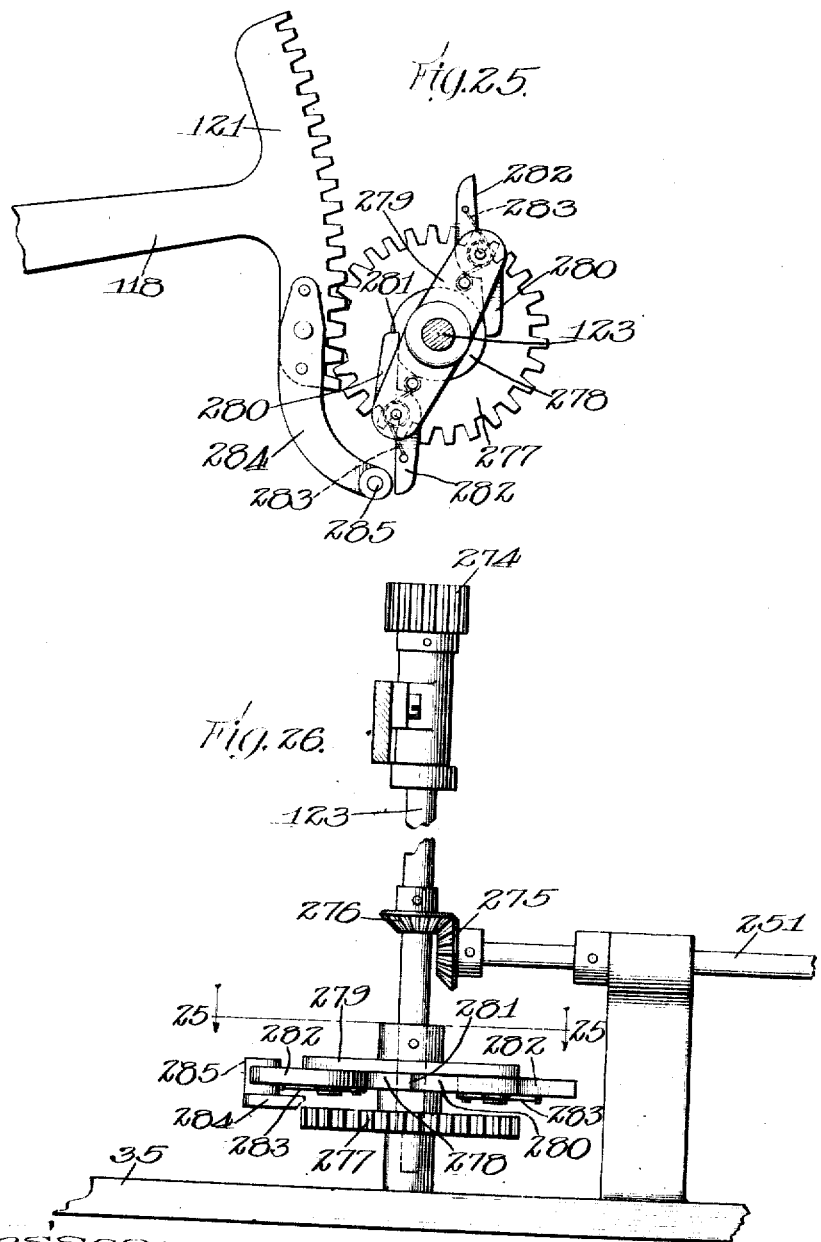

S. E. CARLIN.
CALCULATING MACHINE.
APPLICATION FILED MAR. 4, 1910.
1,274,136.
Patented July 30, 1918.
13 SHEETS—SHEET 13.
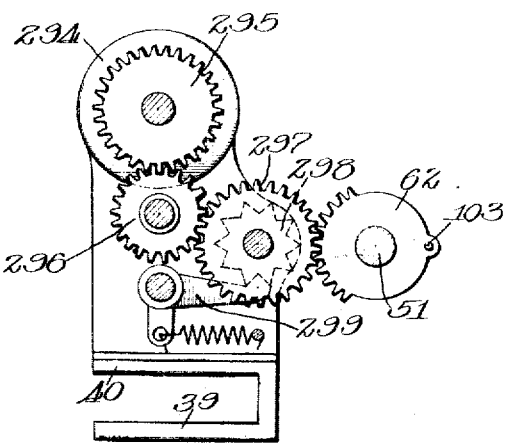
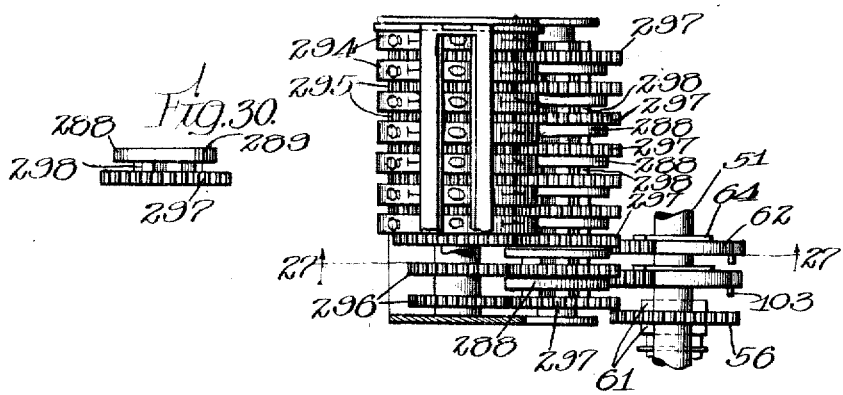
Witnesses:
Inventor:
Samuel E. Carlin,

UNITED STATES PATENT OFFICE.

SAMUEL E. CARLIN, OF CHICAGO, ILLINOIS, ASSIGNOR, BY MESNE ASSIGNMENTS, TO UNDERWOOD COMPUTING MACHINE COMPANY, OF NEW YORK, N. Y., A CORPORATION OF NEW YORK.

CALCULATING-MACHINE.

1,274,136.      Specification of Letters Patent.      Patented July 30, 1918.

Application filed March 4, 1910. Serial No. 547,300.

*To all whom it may concern:*

Be it known that I, SAMUEL E. CARLIN, a citizen of the United States, residing at Chicago, in the county of Cook and State of Illinois, have invented certain new and useful Improvements in Calculating-Machines, of which the following is a specification.

This invention relates to calculating machines, and particularly to such as are employed in tabulating, and adding the totals of tabulated figures or columns.

A machine constructed according to this invention enables a plurality of columns to be footed up on the tabulated sheet, and the numbers are added, in the totalizers or registers, which correspond to the said columns. As the numbers are added they are written upon the tabulated sheet. Although under normal conditions a column written at the left of the sheet will have its numbers added on a corresponding totalizer at the left of the machine, the arrangement is such as to permit the writing of a column at any point on the sheet, and the simultaneous adding of the figures of this column in any one of the totalizers. To effect this freedom of control is one of the objects of the invention.

Another object is to construct the calculating mechanism so as to enable it to be readily connected to an ordinary typewriter. When the calculating machine is so constructed and operated in connection with the typewriter, connections are made to the typewriter keys, so that when the number keys of the calculating machine are depressed, the corresponding key of the typewriter will be depressed, and that number printed upon the machine.

In the form of the invention illustrated, the calculating mechanism includes a plurality of totalizers or registers, which are arranged end to end in longitudinal alinement, and a computing carriage is provided on which there is mounted a plurality of master wheels, which are normally disposed near but out of alinement with the wheels of the totalizers. A connection is made from the typewriter carriage to this computing carriage, so that when the typewriter carriage is advanced through the operation of its escapement, the computing carriage will be correspondingly advanced.

In their normal positions, the master wheels are not active to operate the totalizers, but any master wheel may be put into active connection with its totalizer by depressing the proper key of the calculating machine. This is done before the number is added, and selects or determines the totalizer upon which this particular column will be added.

The computing carriage advances along the active totalizer, and comes successively into connection with the wheels of different denominations. And the number keys of the calculating machine control the mechanism which actuates the master wheel, so as to give it the proper amount of rotation. This master wheel advances automatically along the totalizer, and upon the depression of any key such as the "eight" key of the calculating machine, the master wheel is given the proper rotation to correspond. The master wheels are mounted upon a rocking frame, and in one of its positions this frame holds the master wheel removed from the wheels of the totalizers, and in this position, they are advanced from the wheels of one denomination to the next. As each digit is added, this automatic advance takes place, and the rocking frame then rocks toward the totalizer, so as to bring the active master wheel into mesh with the driven gear of the totalizer. The degree of rotation which is transmitted by the active master wheel is determined by the depression of the number keys of the calculating machine, and the motion is produced by means of the motor which makes one complete revolution as each digit is added. By means of segments of different lengths, any one of which may be made active by the depression of its corresponding number key, the amount of rotation of the master wheel is determined.

An arrangement is provided whereby, when the selecting key of the calculating machine has been depressed it will be automatically locked against return, and in addition to this, all of the other selecting keys which control the actuation of the totalizers are automatically locked simultaneously.

Figure 1 is a detail side elevation of a portion of a typewriter showing an attachment constructed in accordance with the principles of this invention applied thereto.

Fig. 2 is an enlarged side elevation of the calculating attachment with one of the numerical keys in an actuated or depressed position.

Figs. 3 and 4 are detail top plan views of Fig. 1 with a portion of the typewriter removed and portions of the supports for the typewriter formed in section.

Fig. 5 is a detail sectional view on line 5—5 of Fig. 1.

Fig. 6 is a detail sectional view on line 6—6 of Fig. 1.

Fig. 7 is a diagrammatic view of one of the number bearing members of wheels of the totalizers.

Fig. 8 is a sectional view on line 8—8 of Fig. 3.

Fig. 9 is a detail perspective view of the mechanism for locking the keys which have been actuated.

Figs. 10 and 11 are enlarged detail sectional views taken on line 10—10 of Fig. 1, with parts broken away and parts removed.

Fig. 12 is a sectional view on line 12—12 of Fig. 1 looking in the direction of the arrows.

Fig. 13 is a sectional view on line 13—13 of Fig. 1.

Fig. 14 is an end elevation of the motor and escapement mechanism.

Fig. 15 is a detail elevation of the carrying mechanism for the totalizers.

Fig. 16 is a detail elevation of one of the sets of selective mechanisms which is actuated by the keys.

Fig. 17 is an enlarged detail sectional view showing the operating mechanism for one of the totalizers, means for throwing the operating mechanism into and out of active position, and the means for controlling the direction of rotation of the number bearing members of the totalizers according to whether a debit or credit is to be registered.

Fig. 18 is a detail perspective view of the cam for controlling the movement of the totalizer operating mechanism.

Fig. 19 is a detail sectional view taken on line 19—19 of Fig. 3, showing the locking mechanism for holding the totalizer support in position to retain the totalizer and to permit the totalizer to be removed.

Fig. 20 is an enlarged detail sectional view on line 20—20 of Fig. 3, with parts broken away and showing the motor for operating the main shaft and the actuating mechanism for the parts controlled by the main shaft.

Fig. 21 is an enlarged detail sectional view taken on line 21—21 of Fig. 3.

Fig. 22 is an enlarged detail perspective view of the pawl or dog for controlling the escapement.

Fig. 23 is an enlarged detail plan view showing the mechanism for controlling the direction of rotation of the actuating drum or toothed cylinder which communicates motion to the totalizer actuating mechanism.

Fig. 24 is an elevation of one of the totalizers.

Fig. 25 is a sectional view on line 25—25 of Fig. 26.

Fig. 26 is an elevation of one form of connection between the typewriter carriage and the carriage which supports and reciprocates the totalizer operating means.

Fig. 27 is a sectional view on line 27—27 of Fig. 29.

Fig. 28 is an elevation of the carrying disk or element of the totalizer.

Fig. 29 is a top plan view of the form of totalizer shown in Fig. 27.

Fig. 30 is a detail top plan view of one of the gears and the carrying mechanism of the totalizers.

Figure 10:
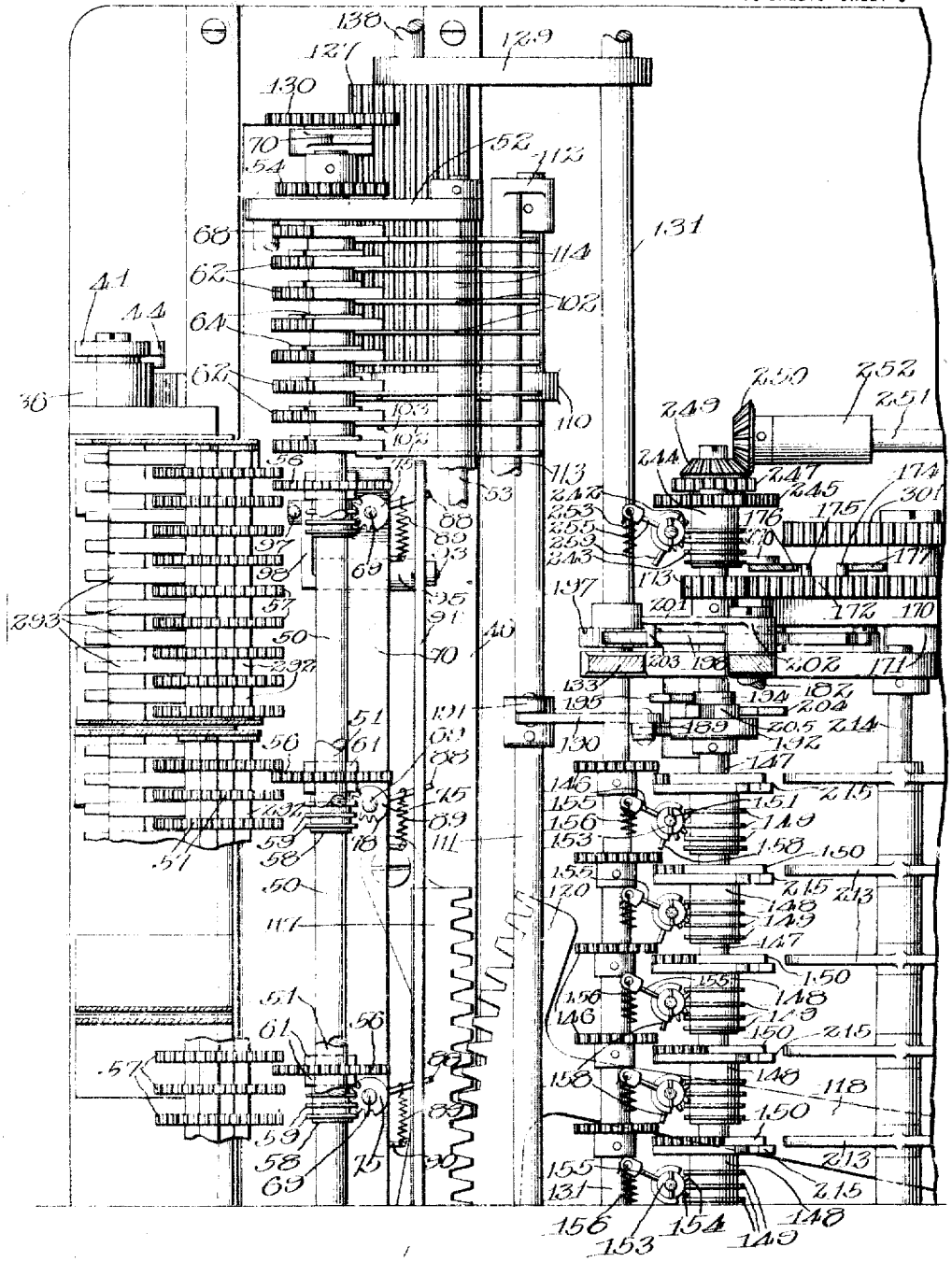

Referring more particularly to the drawings, and in the present exemplification of the invention, the numeral 35 designates a supporting base arranged at the forward edge of which are suitable uprights 36, which are spaced from each other. With its ends pivotally mounted in these uprights is a support or rail 37, which is preferably rectangular in cross-section, and this support is adapted to hold the totalizers or registers designated generally by the reference numeral 38. The frame of the totalizers is provided with a base comprising spaced jaw members 39, 40, forming sockets through which the support 37 extends whereby the totalizers will be detachably secured thereto. When the support 37 is in the position shown in Figs. 1 and 8, the totalizers will be held in position for use. When it is desired to remove one or more of the totalizers without dismantling the entire mechanism, the support 37 may be rotated about its end pivots, after which the totalizers may be readily detached. In order to hold the support in either of its adjusted positions, one of the ends thereof which is reduced to form the pivot or trunnion is provided with a collar 41 having notches 42, 43, and a retaining dog or pawl 44 (see Fig. 19) is pivotally mounted upon the adjacent support 36, and held by a spring 45 in either of said notches.

Mounted upon the base 35 and in the rear of the uprights 36 and the totalizers 38 is a computing carriage 46 comprising a base and uprights 47, the base of the carriage moving between guides 48 and the edges of the guides and the carriage are provided with race ways for the antifriction balls 49, so that the carriage will reciprocate readily within its guide. The carriage is of a length somewhat shorter than the width of the base 35, as shown more clearly in Figs. 10 and 11, and journaled in the uprights 47 is a shaft 50 which is of a length substantially equal to the length of the carriage as shown more clearly in Figs. 10, 11 and 12.

A shaft 51 is arranged above the shaft 50 and is journaled in suitable supports 52, in the form of rocking plates. One of these supports is arranged adjacent each end of the shaft 50 and both these supports are pivotally mounted on the shaft 50 (see Figs. 10, 11, 12 and 17). These supports are connected to move in unison in any desired or suitable manner, preferably by means of a bar or connecting member 53. In this way they form a rocking frame. The shaft 51 is provided with gears 54 located adjacent the extremities thereof and these gears 54 mesh with gears 55 on the shaft 50, so that when the shaft 50 is rotated, motion will be imparted to the shaft 51. Mounted upon and for rotation with the shaft 51 are a series of master wheels or gears 56, and these gears are also mounted for adjustment longitudinally with respect to the shaft. One of these gears 56 is provided for each of the totalizers 38, and the shaft 51 is so mounted with respect to the totalizers that the gears 56 thereon when adjusted into positions for operation, will engage and mesh with the respective gears 57 of the respective totalizers (see Fig. 8). The gears 56 are normally held in an inoperative position with relation to the respective gears 57 so that when any one or more of the totalizers is rendered inactive, the master gears 56 which control the remaining totalizers will not operate their respective inactive totalizers during the operation of the active totalizers, that is to say, when it is desired to register on any one or more of the totalizers 38, the actuating gear 56 of that totalizer must be first set by the selective mechanism, and this operation may be accomplished without affecting the other gears 56. In order to hold the gears 56 normally in an inactive position, suitable mechanism is provided for this purpose which will now be described.

Loosely mounted upon the shaft 50 are a plurality of sleeves 58 which are provided with circumferential ribs or projections 59, and extending upwardly from each of these sleeves 58 are arms 60 which are spaced from each other and are provided with U-shaped yokes 61 at their upper extremities, and which yokes 61 stand astride of the shaft 51. One of the arms 60 is located on each side of each of the gears 56, so that when the sleeve 58 is moved longitudinally on the shaft 50, the respective gear 56 will be correspondingly shifted to place the gear so that it will mesh with one of the gears of the respective totalizers when the supports 52 are shifted. In order to lock the number wheels of the totalizers against overthrow, suitable locking and tens carrying members 62 are provided (see Fig. 15), which are provided with teeth 63, and these members are loosely mounted for oscillatory movement on the shaft 51. The locking and tens-carrying members are spaced from each other a distance equal to the space between the gears 57 of the totalizer so that when the gear 56 engages one of the gears 57, the teeth 63 of the locking member 62 will engage the next adjacent gear 57 when the carriage 46 has advanced far enough. These locking members 62 are held in their adjusted positions by means of a ratchet member 64, one of which is provided for each of the members 62, and these ratchets 64 are provided with a plurality of teeth 65 between which a dog 66 is adapted to project, and this dog 66 is provided with a yielding member 67 for controlling the same. The dogs 66 are preferably mounted upon a support 68 which latter is mounted in the supports 52.

The selective mechanism for shifting the gears 56 into active positions comprises stems 69 which are arranged in upright positions and are supported by means of a guide 70, which guide, preferably forms a continuation of the uprights 47, and through it the stems loosely pass. A collar or shoulder 71 is provided adjacent the lower extremity of each of the members 69, and a spring 72 is arranged between the respective collar and the carriage 46, to return the stem when depressed. The extremity of the stem or member is adapted to be projected into an opening 73 in the carriage 46. A support 74 is also arranged on the carriage 46 and the members 69 pass loosely through this latter support. A sleeve 75 loosely surrounds each of the members 69, and is in turn loosely journaled in the support 74. One extremity of the sleeve 75 projects below the support 74, and is provided with a bifurcated portion 76 into which a pin or lateral projection 77 on the member 69 is adapted to project. The spring 72 tends normally to move the member 69 in a direction to seat the pin or projection 77 in the notch or bifurcation. Each of the sleeves 75 is provided with a segment 78 (shown more clearly in Figs. 8, 10 and 11) and the teeth of this segment cooperate with the projections or shoulders 59 on the sleeves 58 so that when the sleeve 75 is rotated about the member 69 as an axis, the segment 78 of the sleeve will shift the gear 56 longitudinally on the shaft 51. The stems 69 are adapted to be depressed against the tension of the spring 72 to unseat the pin or projection 77 from the notch 76 in any desired or suitable manner, and in order to permit the carriage 46 to reciprocate, and at the same time to depress the rods or members 69 when the carriage 46 is in any position, I provide mechanism which will now be described.

The upper extremity of each stem 69 above the guide or support 70 is provided with an enlarged bifurcated head 79, the forks 80 of which project laterally from the member. A guide 81 is held in position by means of uprights 82 which are secured to the base 35, and rectangular frames 83 are provided as indicated in Fig. 12; and the side bars 84 of these frames pass through suitable guide bearings 85 in the guide 81. The lower extremities of the side arms are connected by cross members 86, and these cross members extend into the bifurcated portions 80 of the member 69 so that the carriage 46 may maintain its connection with the stems during its travel, and when so moved, the members 69 will slide with relation to the members 86 of the respective frames 83. Buttons 87 are provided, one for each of the frames 83, so that by depressing the buttons any one of the totalizer mechanisms 38 may be rendered active at the will of the operator. Any suitable means may be provided for automatically rotating the sleeves 75 to shift the gears 56 on the shaft 51 when the sleeves are released or unlocked, that is, when the pin or projection 77 is unseated from the notch 76. In order to accomplish this result, each of the sleeves 75 is provided with a laterally projecting pin or arm 88, and a spring 89 is secured by one extremity to the pin or projection and is anchored by its other extremity to a fixed support, preferably a projection 90 extending from the support 74. The springs are so arranged that when the gears 56 are moved out of active positions, that is, are moved into positions such that they will not engage one of the gears 57 of the totalizers, the springs will be placed under tension so that the moment the sleeves 75 are released, the springs will exert their tension upon the sleeves 75 to rotate them.

Any suitable means may be provided for rotating the sleeves 75 in the opposite direction, so as to hold and lock the master gears 56 in inoperative positions. For this purpose there may be provided a bar 91 which extends transversely with respect to the arms 88 and parallel with the shaft 50. This bar 91 is preferably provided with notches 92 (see Fig. 12) into which the arms 88 extend, and is supported preferably by means of arms 93 which latter are secured to rock shafts 94 mounted in suitable bearings 95. In order to impart axial rotation to the sleeves 75 by the bar or member 91, it is necessary to rock the shaft 94, and consequently the arms 93 against the tension of a spring 96, one end of which is secured to the bar 91 and the other end of which is anchored to a suitable support. This spring 96 tends to move the bar 91 in one direction, and bars or members 97 similar to the members 69 are connected by one extremity to arms 98 secured to the shafts 94 (see Figs. 8, 10 and 11). The upper extremities of these bars 97 pass through the guide 70 in a similar manner and are provided with bifurcated heads 98 having spaced rearwardly projecting forks 99 between which a bar 100 extends (see Figs. 3 and 8), and a releasing key or bar 101 is secured to this bar 100, so that when the bar or key is depressed, the shaft 94 will be rocked to move the bar 91 and thereby rotate the sleeves 75; this positions the notches 76 with respect to the pins or projections 77 on the stems 69 so that the springs 72 will move the stems 69 longitudinally to seat the pins 77 in the notches 76. This bar 101 may be located in any convenient position, but is preferably located in advance of the frames 83 which are controlled by the keys 87, as shown more clearly in Figs. 3 and 8.

In order to permit the active master gear 56 to move from one to the next of the gears 57 of the respective totalizers 38 as the carriage advances, it is necessary to move the gears 56 away from the totalizers during the advancing movement of the carriage. If this were not done the sides of the gears might strike together, and prevent their meshing. After the carriage 46 has advanced, the gears 56 are then moved laterally back toward the totalizers so that they may engage or mesh with the gears 57 of the next denomination. In order to accomplish this, the rocking frame which comprises the supports 52 and the connecting member 53 is swung about its point of pivotal support on the shaft 50 by mechanism which will now be described, and which mechanism will not interfere with the reciprocation of the carriage 46 and the gears 56. Pivotally supported, preferably by the bar or connecting member 53, and intermediately of their ends, are a plurality of arms 102, one of which arms is provided for each of the locking members 62 of the number wheels of the totalizers. These arms are preferably eight in number—one for each of the number wheels with the exception of the number bearing member of the lowest denomination. These arms 102 are connected with the respective locking members 62 by means of a loose connection, preferably in the form of a pin, and slot connection 103, 104, (Fig. 17,) so that the locking members 62 will be permitted to have only a limited oscillatory movement about the shaft 51. The free extremity of the arms 102 is enlarged as at 105, and is provided with an aperture or opening 106, the sides 107 of which converge from a point adjacent the point of pivotal support to the end 108. The wall of the aperture 106 opposite to the reduced portion 108 is formed with a cam surface 109 for a purpose to be set forth. Journaled in suitable supports 110 mounted upon the base 35 is a rock shaft 111 which is of a length substantially equal to the width of the machine. This shaft 111 is preferably located in a plane below the shaft 50, secured to this shaft 111, preferably adjacent the extremities thereof are arms 112 which are connected at their free extremities by means of a bar or cross member 113 which extends through the apertures 106 in the ends 105 of the arms or members 102. This connecting bar 113 is of a diameter somewhat less than the diameter of the aperture 106, so that the arms 112 and the member 113 may move independently for a limited distance with respect to the arms 102. The arms may be spaced from each other in any suitable manner, preferably by means of spacing collars or washers 114.

When the shaft 111 is rocked in a manner which will be hereinafter set forth, and assuming the cross bar or member 113 to be in the position shown in Fig. 17, the member 113 will be moved toward the end 108 of the aperture 106 in the extremities 105, and will be directed into the end by the inclined sides 107. This movement of the member 113 will rock the arms 102 about their pivots and consequently the locking members 62, so as to return them to normal position when the gears 56 are moved out of engagement with the respective gears 57 of the totalizers. In this position the carriage 46, together with the supported mechanism may be advanced or retracted. At the end of the step of advancement the shaft 111 will be rocked in a manner to be set forth, so as to move the member 113 against the cam face 109 of the arms 102, and this movement will swing the rocking frame (comprising the supports 52 and the connecting bar or member 53) to place the active gear 56, which has been slid into operative alinement, actually in mesh with the corresponding gear 57 of the totalizer. Should the gears 56 be in such a position as to mesh with any of the gears 57 of the respective totalizers other than the gear 57 which comprises the number wheel of the highest denomination, one or more of the locking members 62 will also be in mesh with the respective gears 57, owing to the fact that the carriage 46 supporting this mechanism has been advanced. In this position it will be apparent that when the number is carried from a number wheel of the totalizer to the next adjacent number wheel of a higher denomination by means of the carrying mechanism which will be presently described, the number wheel of the higher denomination will cause its gear 57 to be rotated during the carrying movement, and this rotation of the gear will correspondingly rock the locking member 62 about the shaft 51. During this operation, the locking member 62 will restrain or lock the number wheel against overthrow. In order to permit this operation, the pin and slot connection 103, 104 between the locking members and the arms 102 is provided, and this loose connection, together with the cam face 109 which coöperates with the bar 113 on the arms 112 will permit the locking member to have only a limited degree of movement in either direction, and when so adjusted, the locking member will be held in its adjusted position by the dog or pawl 66 during the time that the locking member is in engagement with the gear 57. After the calculation or carrying operation, the shaft 111 will be rocked and the member 113 will be moved out of engagement with the cam 109 so as to rock the arms 102 about their pivots in the manner already set forth, and this rocking movement of the arms will move the locking members 62 in the opposite direction to true the locking members, and during this movement the dogs 66 will yield so that they will enter another space between the projections 65 on the elements 64.

The advancing movement of the carriage 46, together with the mechanisms supported thereby, is controlled by the movement of the typewriter carriage, designated generally by the reference numeral 115 of the typewriter 116 (shown in Figs. 1 and 4) and which carriage is intermittently advanced in the ordinary and well known manner by the manipulation of the spacing key of the typewriter. In order to accomplish this result, intermediate connecting mechanisms between the typewriter carriage and the carriage 46 are provided, and these connections preferably comprise a rack 117, which is secured to and supported for movement with the carriage 46, as shown more clearly in Figs. 1, 8, 10 and 11. An arm 118 is pivotally supported intermediate its ends, as at 119, and is provided with a toothed segment 120 on one end thereof, and which segment meshes with the rack 117 on the carriage 46, so that when the arm 118 is oscillated about its point of pivotal support 119, the carriage 46 will be correspondingly reciproated. The other end of the arm 118 is also provided with a segment 121 which meshes with a gear 122, which latter is connected with an upright shaft 123 at the rear of the typewriter mounted in suitable bearings 124. This shaft 123 is connected at its upper extremity with a gear 125 which meshes with a rack 126 supported by the typewriter carriage, so that when the typewriter carriage 115 is spaced in the ordinary and well known manner, motion will be imparted to the shaft 123 through the medium of the rack 126 and gear 125, and which motion will in turn be imparted to the arm 118 through the medium of the gear 122 on the shaft and the segment 121 on the arm 118.

In order that the shaft 50 may be adjusted longitudinally at the same time that the carriage 46 is adjusted, and also to be rotated in any of its adjusted positions, mechanism is provided whereby these two operations may be accomplished. A suitable and efficient means for accomplishing this purpose comprises an elongated cylinder or drum 127, which is provided with peripheral teeth or ribs, and is journaled in suitable supports 128, 129 (see Figs. 3, 10 and 17), and meshing with this drum or cylinder 127 is a gear 130, which latter is secured to and for rotation with the shaft 50. The supports for this drum are stationary and the drum is fixed, so that when the carriage 46 is reciprocated, the gear 130 on the shaft 50 will remain in mesh with the teeth on the drum and will be reciprocated longitudinally with respect to the drum, the drum being of a length to permit the full reciprocation of the carriage. Any suitable means may be provided for imparting motion to the drum, and for this purpose there is provided a shaft 131 which extends transversely across the machine parallel with the shaft 50, and is journaled in suitable supports 132, 133, 129 (see Figs. 10, 11 and 17). One extremity of this shaft 131 projects beyond the support 129 and secured thereto and for rotation therewith are gears 134, 135, which gears are preferably spaced from each other by means of a spacing collar 136, and one of these gears, preferably the gear 134, is of a diameter somewhat larger than the diameter of the gear 135, as shown more clearly in Fig. 23. The gear 134 meshes directly with the gear 137, which is secured to a shaft 138 forming a continuation of the drum or cylinder 127, and which projects beyond the support 129. The gear 137 is loosely mounted upon the shaft 138 and the gear 139 is also loosely mounted upon the shaft 138. One of these gears, preferably the gear 139 is of a diameter somewhat smaller than the diameter of the gear 137, and has connection with the gear 135 through the medium of an intermediate or idle gear 140 journaled to the support 129. These gears 137, 139 are respectively provided with clutch faces 141, 142, and a clutch member 143 is keyed upon the shaft 138 intermediate the clutch members 141, 142, and is adapted to be moved into or out of engagement with either of the clutch faces 141, 142 by means of an operating handle or lever 144 (see Figs. 17 and 23) for locking the respective gears 137, 139 for rotation with the shaft 138, thereby controlling the direction of rotation of the drum 127 to cause the shaft 50, and consequently the shaft 51 to rotate either forwardly or backwardly to impart a corresponding movement to the number bearing members of the totalizers, according to the work to be performed, that is, according to whether the number to be registered on the totalizers is to be added to or subtracted from the amount already registered.

The drum or cylinder 127 is adapted to be intermittently rotated, and is also adapted for variable movement according to the number which it is desired to register on the totalizers. In order to control the degree of rotation of the drum, selective mechanisms are provided which are controlled by a series of keys 145, as shown more clearly in Figs. 1 and 3.

The selective mechanisms which are controlled by these keys 145 and which in turn control the degree of rotation of the shaft 131, as well as the drum 127, will now be described. These selective mechanisms are similar in construction to the selective mechanisms already described, which are adapted to render any one or more of the totalizer operating mechanisms active.

Secured to and for rotation with the shaft 131 are a series of gears 146 which are spaced from each other longitudinally with respect to the shaft 131, and nine of these gears are provided, one for each of the keys 145, as shown more clearly in Figs. 8, 10 and 11. A shaft 147 is journaled in the supports 132, 133, and is arranged preferably in the rear of the shaft 131 and parallel therewith. This shaft 147 is spaced from the shaft 131 and mounted thereon are sleeves 148 which sleeves are secured to the shaft 147 for rotation therewith and are adjustable on the shaft longitudinally with respect thereto. These sleeves 148 are similar in construction to the sleeves 58, and are provided with a plurality of circumferential ribs 149 similar to the ribs 59. One of these sleeves 148 is provided for each of the gears 146, and supported by these sleeves for adjustment therewith are mutilated gears 150 so arranged that when the sleeves are adjusted in one direction on the shaft 147, the mutilated gears 150 thereon will mesh with the respective gears 146. These gears 150 are provided with a different number of teeth ranging from 1 to 9, that is, the gear which is connected with the sleeve 148 nearest the left hand side of the machine in the present exemplification of the invention, is provided with teeth corresponding to one unit, and the number of teeth on the gears 150 progressively increase toward the gear on the right hand side, and which latter gear has an effective periphery nine times that of the unit gear so that when any one of the gears 150 is in position to mesh with the respective gears 146, the shaft 131 will be given a number of steps of rotation equivalent to the number of teeth on the mutilated gear 150 which is in an operative position. After the mutilated gear has imparted a corresponding number of steps of rotation to the shaft 131, the mutilated gear will be automatically thrown out of operative position in a manner to be presently described, and the shaft 131, after having imparted its movement to the drum or cylinder 127, will stop. This operation completes the registering or calculation on the totalizers. After the calculation has been completed, the operating gears 56 of the totalizers will be shifted laterally with respect to the totalizers, and out of mesh with the gears 57 to permit the carriage 46 and the gears 56 and locking elements 62 to be advanced, in a manner as has already been set forth.

Any suitable means may be provided for shifting the sleeves 148 and the gears 150 on the shaft, and for this purpose there may be provided a plurality of upright stems 151 which are adapted to be reciprocated and are mounted for movement through a support 152 (see Figs. 8, 10, 11, 13, 16 and 21). These stems 151 pass loosely through the sleeves 153, which are similar in construction to the sleeves 75, and which are mounted for axial movement in the support 152. These sleeves 153 are provided with segments 154 similar to the segments 78 of the sleeves 75, and the segments 154 mesh with the respective ribs 149 on the sleeves 148, so that when the sleeves 153 are rotated in one direction about the stems 151, the sleeves 148 and associated gears 150 will be moved on the shaft 147 longitudinally thereof, and in the corresponding direction, and when the sleeves 153 are rotated in the opposite direction, the sleeves 148 will be correspondingly adjusted.

Each of the sleeves 153 is provided with a laterally projecting finger 155, and a spring 156 is secured by one extremity to each of the fingers 155, and is anchored by its other extremity to a fixed support 157. The support 157 and spring 156 are so arranged that the normal tendency of the spring is to rotate the sleeve 153 in one direction to correspondingly shift the sleeve 148. Each of the sleeves is also provided with a lateral projecting pin 158, and these pins 158 are adapted to be engaged by an arm 159 secured to a rock shaft 160, so that when the shaft 160 is rocked in a manner to be hereinafter set forth, the arms 159 will engage the projection 158 on the respective sleeves 153 to rotate the sleeves in the opposite direction and against the tension of the spring member 156 so as to shift the sleeve 148 on the shaft 147 in the opposite direction.

In order to lock the sleeves 153 against operation by the tension of the spring 156 and to hold the gears 150 out of mesh with the respective gears 146, suitable locking mechanism is provided, which, in the present exemplification of the invention, comprises a notch 161 in the sleeve 153, within which a pin or projection 162 supported by the stem 151 is adapted to be seated when the gears 150 are in inoperative positions. As soon as the stem 151 is shifted to unseat the pin or projection 162 from the notch 161, the spring 156 of the sleeve 153 which has been released will operate to rotate the latter. Any suitable means may be provided for connecting the stems 151 with the respective keys 145, so that when the latter are actuated, the respective stems will be shifted to release or unlock the sleeves 153. For this purpose there is provided a plurality of arms 163 which are pivotally mounted intermediate their ends on a suitable support 164, preferably in the form of a bar or rod which is arranged to extend across the machine and at a point above the shafts 131, 147 (see Figs. 3 and 8). The arms 163 are pivotally connected adjacent one end, as at 165, with the respective stems 151 and serve as a means for supporting the stems. The other extremities of the arms 163 are pivotally connected as at 166 to the respective stems 167 of the keys 145, and these stems 167 pass loosely through the support 81. The arms 163 are preferably connected to the respective stems 167 of the keys 145 in such a manner that when the keys are depressed, the stems 151 will be elevated, and when the keys are returned to their normal positions, the stems 151 will be lowered so that the pins or projections 162 thereon will be seated in the notches 161 of the respective sleeves 153. In order to return the keys 145 to their normal positions, suitable springs 168, are provided, one extremity of which is secured to the respective arms 163 on one side of the pivot, and the other extremity is anchored to a suitable support 169, and this support, together with the support 164, are held in position by means of extensions on the supports 132, as shown more clearly in Figs. 1 and 3.

The shaft 147 is adapted to make one complete revolution and then stop, and in order to impart this intermittent rotation to the shaft, any mechanism suitable for this purpose may be employed. A suitable and efficient means, however, will now be described and comprises a spring motor 170, the axle 171 of which is journaled (see Figs. 1, 14, 20 and 21) in any suitable support, preferably the support 132, and the motor is provided with peripheral teeth 172, and the teeth are so arranged as to mesh with a pinion 173 on the shaft 147, as shown more clearly in Figs. 1 and 10. This spring motor is provided as shown in Fig. 21 with a plurality of lateral projections 174, 175, arranged in two series around the circumference of the casing, and coöperating with these projections is an escapement comprising arms 176, 177, and the escapement is pivotally mounted as at 178 on a suitable support 179. The arms are provided respectively with inwardly projecting teeth or nibs 180, 181, which are adapted to be alternately projected into and out of the paths of movement of the projections 174, 175, so that when the escapement is rocked about its pivot, the projection on one of the arms will move out of engagement with the respective projections on the motor, while the projection on the other arm moves into the path of movement of one of the projections of the other series on the motor. These projections are so arranged that during the interval that the motor gear 172 moves, the shaft 147 will make one complete revolution. Any suitable means may be provided for rocking the escapement by each of the keys 145 when the latter are actuated, so that the motor will be released to actuate the mechanism. For this purpose there is provided a pivot bar 182, which latter is held in position, preferably by means of extensions on the supports 132, 133, as shown more clearly in Figs. 1, 3, 10, 11 and 13. Secured to the support 182 are a plurality of arms 183 which are spaced from each other in any suitable manner, preferably by means of tubular extensions 184 which form a portion of the arms, and which surround the support. One of these arms 183 is provided for each of the arms 163, which latter are controlled by the keys 145. The portions of the arms 163 beyond the point of pivotal connection 165 with the respective stems 151 are provided with lateral projections 185, and these projections 185 and arms 183 are so arranged with respect to each other that when the respective keys 145 are actuated to rock the arms 163 about their points of pivotal supports 164, the projection 185 will engage the adjacent arms 183 and will move the latter to rock the support 182, this support being mounted in the uprights 132, 133 for such movement. An arm 186 is secured to the support 182 intermediate its ends and one extremity thereof is connected by means of a link 187 and a projection 188 on the escapement formed by the arms 176, 177, so that when any one of the arms 183 is actuated in the manner just set forth, to rock the support 182, the escapement will be correspondingly rocked or shifted to permit the motor to make one step of revolution and thereby impart one complete revolution to the shaft 147. This shaft 147 will give to the shaft 131 a variable movement according to which of the gears 150 is placed in operative position with relation to the respective gears 146 by the actuation of the keys 145. The frame comprising the supports 52 and the connecting member 53 which supports the gears 56 and the overthrow locking members 62 of the totalizers 38, as has already been stated, is rocked about its point of pivotal support, which is the shaft 50, to move the gears into and out of mesh with the gears 57 of the totalizers, and this adjusting or shifting movement of the supports and gears is accomplished by means of connections between the shaft 147 and the rock shaft 111, and suitable mechanism for accomplishing this result will now be described, reference being particularly had to Figs. 1, 10, 11, 13 and 20. Loosely mounted upon the shaft 160, and preferably adjacent the ends thereof, are arms 189 which are connected by means of links 190 to arms 191, which latter are secured to the shaft 111. Secured to and for rotation with the shaft 147 are cams 192, which are adapted to engage the free extremities of the arms 189, and rock the latter about their support 160, which will in turn rock the arms 191 and the shaft 111 through the medium of the connecting links 190. The cams will move the arms 189 in one direction, or in a direction to cause the arms 112 to shift the member 113 into engagement with the cam face 109 of the arms 102, so as to rock the frame comprising the supports 52 and the member 53 to move the gears 56 thereon into position to engage the gears 57 of the totalizers. The shaft 111 may be rocked in the other direction and the arms 189 returned after the cams 192 have passed out of engagement with the arms to positions to be again engaged by the cams in any desired or suitable manner, but preferably by means of springs 193. In order to rock the shaft 160 so as to rock the arms 159 to cause the latter to engage the pins or projections 158 on the sleeves 153, and thereby rotate the sleeves so as to shift the sleeves 148 on the shaft 147 out of operative position and against the tension of the springs 156, cams 194 are provided on the shaft 147 and are secured thereto for rotation therewith. These cams 194 are adapted to engage arms 195, which latter are secured by one extremity to the shaft 160 and the cams 192 and 194 are so positioned with respect to each other that the operation of the parts controlled by the rocking of the arms 189, 195 will be properly timed with respect to each other. Any suitable means may be provided for rocking shaft 160 in the opposite direction so as to move the arms 159 out of engagement with the pins or projections 158 to permit the springs 156 to rotate the sleeves in the opposite direction to move the gears 150 into active positions with respect to the gears 146, and for this purpose springs 196 may be provided, one extremity of which is secured to the arms 195 and the other extremity anchored to a suitable fixed support.

In order to lock the shaft 131, on which the gears 146 are mounted, against overthrow, any suitable means may be provided, such as a star wheel 197, shown more clearly in Figs. 10, 13 and 20, which is secured to the shaft 131 and for rotation therewith. A locking dog 198 is pivotally mounted, as at 199, on a fixed support, and the extremity 200 of the dog is adapted to be moved into the space between the teeth on the star wheel at the completion of the rotation of the shaft 131. Any suitable means may be provided for rocking the dog 198 in one direction, such as an arm 201 which is pivotally supported as at 202 to a fixed support, and is provided with a projection 203 which extends over the dog 198 in advance of its pivot. An arm 204 is connected to the arm 201, and projects in a direction toward and terminates adjacent the shaft 147. A cam 205 is also secured to the shaft 147, and for rotation therewith, and is adapted to engage the end of the arm 204 to rock the arm 201 to cause the projection 203 on the latter to depress the end 200 of the dog 198 into the space between adjacent teeth of the star wheel 197. This operation is so timed that the dog will enter the space at the completion of the cycle of movement of the shaft 131. When the shaft 147 is again rotated, the cam 205 will move away from the end of the arm 204 and when the shaft 131 is rotated by one of the gears 150, in the manner already set forth, the teeth of the star wheel will force the end 200 of the dog 198 in the opposite direction to its pivot to unlock the shaft and during this movement the dog 198 will engage the projection 203 on the arm 201 and raise the latter so as to position the arm 204 to be engaged by the cam 205 when the shaft is again rotated.

In order to lock the dog 198 in each of its adjusted positions, the other extremity of the dog beyond its pivot is enlarged as at 206, and is provided with notches 207 into which the end of a dog 208 is adapted to project, and a spring 209 will yieldingly hold the dog 208 in either of the notches.

It is thought that the operation of this portion of the mechanism will be clearly understood, but briefly stated, it is as follows:

After the operator has decided on which one of the totalizers 38 he desires to register the amounts, the selective mechanism for rendering the actuating mechanism for that particular totalizer active is first actuated by depressing the corresponding key 87. When one of these keys has been depressed, the respective stem 69 will be depressed to unseat the pin or projection 77 thereon from the notch 76 of the sleeve 75. This operation will unlock the sleeve 75 and will permit the spring 89 to shift the corresponding gear 56 on the shaft 50 and longitudinally thereof to a position so that when the frame comprising the supports 52 and the connecting member 53 is rocked forwardly toward the totalizers, the active master gear 56 will engage and mesh with one of the gears 57 and the key 87 will be held against return movement by the engagement of the pin or projection 77 on the stem 69 against the edge of the sleeve 75. When a totalizer is thus rendered active, the operator may then actuate any one of the keys 145, according to the amounts to be registered. The actuation of this key will raise the stem 151 (see Fig. 16) to release the respective sleeves 153 and thereby permit the spring 156 to rotate the sleeve, which rotation will shift the respective sleeves 148 on the shaft 147 and longitudinally thereof, so as to position the mutilated gear 150, in any such way that when the shaft 147 is rotated, the gears 150 will mesh with the respective gears 146 to impart rotation to the shaft 131. As the key 145 is actuated, the arm 183 will simultaneously be actuated to rock the support 182 and this movement will in turn actuate the escapement comprising the arms 176, 177 to permit the motor 170 to move one step, or until one of the projections 174, 175 on the motor engage the respective projections 180, 181 on the arms 176, 177. The arms 183 are so located that the motor will start to actuate before the mutilated gears 150 mesh with the gears 146, so that the cams 192 on the shaft 147 will begin to actuate the arms 189 as soon as the shaft starts, so as to rock the shaft 111 through the medium of the connecting links 190 and arms 191 to rock the arms 112 and connecting member 113. This actuation of the member 113 will move the latter into engagement with the cam faces 109 on the arms 102 and will rock the frame comprising the supports 52 and connecting member 53 about the shaft 50 to move the gear 56 which has been rendered active, into mesh with the opposite gear 57. By the time the gear 56 has moved into this position, the gear 150 which has been rendered active will begin to actuate the shaft 131, and the degree of movement of the shaft 131 will be controlled by the number of teeth on the gear 150 which has been rendered active. This variable movement of the shaft 131 will be communicated to the drum or cylinder 127 through the medium of the connecting gearing, and the rotary motion of the drum will in turn be communicated to the shaft 51 and consequently the gear 56, through the medium of the connecting gears 130, 55 and 54, between the shaft 51 and the drum or cylinder, so that the gear 56 will be rotated a degree of movement corresponding to the number of teeth on the gear 150. This operation will rotate the corresponding number bearing member of the totalizer. At the completion of the rotation of the shaft 131 by the gear 150, the shaft 131 will be locked against overthrow by the dog 198, and the star wheel 197. After the shaft 131 has made one complete revolution, the parts will be rendered inactive, or returned to their normal positions, and the gears which have been rendered active will be rendered inactive by the medium of the cams 194 and the arms 195, which are rocked by these cams to rock the shaft 160, and this rocking movement will cause the arms 159 to engage the pins or projections on the sleeves 153 and rotate the latter against the tension of the springs 156 so as to position the notch 161 in the sleeve 153 to receive the pin or projection 162 on the stem 151 and thereby permit the spring 168 to return the actuated key 145. As the arm 159 rotates the sleeve 153, the gear 150 will be shifted into an inoperative position. In Fig. 11 of the drawings, the gear 150 having nine teeth is shown as being in an operative position, and in Fig. 8 the key designating the number 9 is shown as being actuated.

This operation will release all of the actuating mechanism, but will not affect the gears 56, which latter will remain in active positions until released by the operator. After the completion of the cycle of movement just described, the carriage 46 supporting the gears 56 will be advanced one step by the advancing movement of the typewriter carriage 115 through the medium of the connecting arm 118 and the carriage of the typewriter is advanced by actuating the spacing mechanism of the carriage. In order to automatically space the carriage by the actuation of the keys 145, suitable mechanism for accomplishing this result will now be described.

The typewriter carriage is spaced in the ordinary and well known manner, and the recording of the amounts on the paper supported by the platen is accomplished with this improved attachment by actuating the numerical keys 212 of the typewriter 116. In order, therefore, to actuate these number keys 212 by the manipulation of the keys 145, suitable connecting mechanism must be provided between the keys 145 and the respective type-keys 212, shown in Fig. 1. A suitable and efficient connection comprises a plurality of levers 213 (shown more clearly in Figs. 8, 10 and 11). These levers are pivotally mounted intermediate their extremities on a suitable support 214, which latter is preferably journaled in the uprights 132, 133, and extends parallel with the shaft 147. One of these levers 213 is provided for each of the gears 150, and one extremity of the levers is arranged adjacent and in proximity to the respective gears 150 when the latter are shifted longitudinally on the shaft 147 into an operative position. Each of the gears 150 is provided with a projection 215 which preferably extends beyond the teeth of the gear so as to engage the extremity of the adjacent lever and rock the latter about the support 214. Pivotally connected to the other end of each of the levers 213 is a link 216, and the upper extremities of these links 216 are hooked over the operating arm of the respective keys 212. The typewriter 116 rests upon suitable uprights 217, so as to hold the typewriter elevated above the base 35, and in such a position that the key frame projects over a portion of the adjustment just described, so that the keys 145 and 87, also the bar or member 101, will be located in close proximity to the front of the frame. In order to return the levers 213 after they have been rocked by the projection 215 on the respective gears 150, a spring 218 may be provided for each of the levers, one extremity of which is connected to the respective levers and the other extremity is anchored to a suitable fixed support.

With this improved construction, it will be apparent that whenever one of the keys 145 is actuated, the corresponding key of the series 212 on the typewriter will be actuated, and the actuation of this key of the typewriter will not only record the number on the paper, but will automatically space the carriage 115 of the typewriter in the ordinary and well known manner.

It will also be apparent that by the provision of the hook connection 216 between the keys of the series 212 and the levers 213, the keys 212 of the typewriter, or any other keys thereon may be readily actuated without interfering with, or without causing the operation of any of the parts of the calculating attachment.

In order to prevent the operation of more than one key of the series 145 at a time, or to prevent the actuation of another key of the series when one key has already been actuated, and before the completion of the cycle of movement of the parts set in motion by the actuation of the first key, suitable locking mechanism is provided, and this mechanism preferably comprises a locking bar 219 (Figs. 8, 9 and 13) which is provided with a plurality of notches 220, and this locking bar is supported in any desired or suitable manner, preferably by means of the arms 189, so as to extend across the machine adjacent the stems 151, as shown more clearly in Figs. 1, 9 and 20. This locking member is arranged so that one of the notches 220 will stand adjacent each of the stems 151 and normally in a position to one side of the stems, and is adapted to be moved so that the notches 220 will stand astride or receive the stems 151 when the arms 189 are rocked by the cam 192, in the manner already set forth. Each of the stems 151 is provided with a pin or projection 221 (see Fig. 16) similar to the pin or projection 162 and is spaced above the latter a distance to permit the bar or member 219 to pass between the pins or projections when the stem 151 has been shifted to unseat the pin or projection 162 from the notch 161, as shown more clearly in Fig. 13. The operation of this locking member is as follows:

Assuming the number 9 key of the series 145 to be depressed, the pin or projection 162 will be unseated from the notch 161 in the sleeve 153 and will move into the position shown at the left hand end of Fig. 13, that is, with the pin or projection 162 adjacent the edge of the sleeve 153. In this position and when the arm 189 is rocked by the cam 192 in the manner already set forth, the locking member 219 will be moved forwardly so that the notches 220 will straddle the stem 151. As the pins or projections 162, 221 will be positioned in the manner shown at the left hand of Fig. 13, the locking bar or member 219 will pass between these pins or projections on the stem of the 9 key, while the bar or member will pass over the pins or projections 221 on the stems 151 of the remaining keys of the series to lock the latter against operation. When the arms 189 are returned by the springs 193, the locking bar 219 will be moved away from the stems 151, and all of the keys will be released or unlocked.

In the present exemplification of the invention, it will be noted that the calculating attachment is provided with only nine numerical keys, whereas, the typewriter is provided with ten numerical keys, and the carriage 46 which supports the totalizer actuating mechanisms is spaced or advanced by the movement of the typewriter carriage 115. In writing a table of figures, on account of the fact that the typewriter carriage feeds from the right to the left, the digits of higher denomination must be added first. I provide a clutch connection from the typewriter carriage to the computing carriage which opens automatically when a unit digit is added so as to return the computing carriage along the totalizer so as to be ready to add the next line of digits. It is only necessary for the typewriter carriage to advance the computing carriage through nine spaces for the reason that there are only nine number wheels in each totalizer. I therefore arrange the said clutch so as to open automatically after a number containing nine digits is added. And it will be evident that if instead of adding the digits of higher denomination the space key were depressed the same effect would be produced. In other words the clutch simply opens automatically by the escapement movement at a time when the computing carriage has just actuated a unit digit, that is, the escapement movement following the actuation of a unit number wheel returns the computing carriage automatically. The mechanism for this purpose will now be described.

A gear 122 which meshes with the segment 121 on the arm 118 is loosely mounted upon the vertical shaft 123 and rigid with the gear (see Figs. 1, 4 and 5) is a collar 220 which is notched to form shoulders 221, 222. An arm 223 is fast on the shaft 123 and pivotally supported by this arm is a dog or pawl 224, one extremity of which coöperates with the shoulders 221, 222 on the sleeve 220, and a spring 225 is provided which tends normally to hold the end of the arm in a position to engage one of the shoulders 221, 222 when the shaft 123 is rotated. This mechanism just described locks the gear 122 for rotation with the shaft 123. The pinion 125 is loosely attached on the upper end of the shaft 123, and this pinion is formed below into a ratchet-gear 226 (see Fig. 6). An arm 227 is also fixed to the shaft 123 for rotation therewith, and a pawl 228 is pivotally supported by the arm 227 and coöperates with the ratchet gear 226 of the gear 125 to lock the latter to the shaft 123 for rotation therewith in one direction. A spring 229 is provided which tends normally to hold the dog 228 in engagement with the ratchet 226 to lock the gear 125 to the shaft when the gear is rotated in one direction, and to permit the dog 228 to ride freely over the ratchet 226 when the gear 125 is rotated in the opposite direction, that is the direction of rotation imparted thereto when the carriage 115 of the typewriter is returned after having been advanced. With this mechanism it will be apparent that as the carriage of the typewriter 115 is advanced, the arm 118 will be rocked about its pivot 119 to advance the carriage 46. The carriage 46 will advance with the carriage 115 of the typewriter during nine steps of advancing movement corresponding to the nine keys of the series 145. In order to permit the typewriter carriage 115 to advance one more step independently of the carriage 46, mechanism must be provided for releasing or unlocking the gear 122 with respect to the shaft 123, so that the tenth step of advancing movement of the carriage of the typewriter, although it will rotate the shaft 123, the rotation will not be imparted to the gear 122. Suitable mechanism for accomplishing this result or releasing the gear 122 comprises spaced uprights 230, 231 (Figs. 1 and 5), and these uprights are mounted upon a base 232, so that they will be positioned to be engaged by the extremity of the dog or pawl 224 at the completion of the ninth step of advancing movement of the typewriter carriage. As the typewriter carriage makes its ninth step of rotation, the arm 223 which supports the dog or pawl 224 will rotate with the shaft 123 to position the extremity of the dog or pawl adjacent one of the uprights 230, 231. Assuming the parts to be in the position shown in Fig. 5, the ninth step of rotation of the shaft 123 will position the dog or pawl 224 adjacent the upright 230 so that at the commencement of the tenth step of movement of the typewriter carriage 115, the extremity of the dog or pawl will engage the upright 230 to be rocked thereby to move the other end of the dog out of engagement with the shoulder 222 on the sleeve 220. This operation will unlock the gear 122 from the shaft and the shaft will be permitted to rotate until the end of the dog or pawl 224 has passed the upright 230 and the shoulder 221 has moved into a position adjacent the dog or pawl 224 to be engaged by the latter, which will then again lock the gear 122 to the shaft. When the typewriter carriage has advanced nine steps, the carriage 46 will be correspondingly advanced so that the totalizer operating gear 56 will be in a position to mesh with the gear 57 of the number bearing member of the lowest denomination of the respective totalizers. In order to further register on the totalizers, it is necessary to return the carriage 46 to its original position, so that by the next operation of one of the keys of the series 145, the carriage 46 will again be advanced to move the operating gear 56 with relation to the respective totalizers corresponding to the key of the series 145 which has been actuated. This return movement of the carriage 46 takes place during the time which the typewriter carriage is advancing its tenth step, and when the gear 122 is unlocked from the shaft 123. In order to automatically return this carriage 46, it is necessary to provide means whereby the arm 118 may move in the opposite direction about its point of pivotal support 119. A suitable and efficient means for accomplishing this purpose comprises a spring 233 (shown more clearly in Figs. 1 and 3). This spring is connected by one extremity to the arm 118, and by its other extremity to an adjustable member 234 which is anchored to a fixed support 235 and adjustable with respect thereto, so that the tension of the spring 233 may be varied. The spring is so arranged that during the nine steps of the advancing movement of the typewriter carriage, a tension will be created upon the spring so that when the gear 122 is unlocked in the manner just described, the elasticity of the member 233 will move the arm 118 in a direction to return the carriage 46. The carriage 46 does not start to return until the gears 56 and the locking members 62 of the totalizers have been shifted laterally so as to move them out of mesh with the gears 57 of the totalizers, and in order to accomplish this, the mechanisms are so timed that the gears of the totalizers will be shifted out of mesh before the carriage 46 begins to return.

It is also necessary to provide means whereby the typewriter carriage may be returned independently with respect to the carriage 46, and for this purpose the pawl and rack connection 228, 226 between the gear 125 and the shaft 123 is provided.

In order that the typewriter carriage 115 may be returned from any position to which it has been advanced, to a predetermined position, without affecting the operation of the calculating mechanism, which return movement, as has before been stated, is permitted by means of the ratchet and pawl connection 228, 226 between the carriage 115 and the shaft 123, and at the will of the operator, there is provided a key 236 (shown more clearly in Figs. 3 and 21), which will be hereinafter designated as the tabulating key. This key 236 is constructed to operate in a manner similar to the keys 145, and controls mechanism operating as a clutch, but similar in its construction to the selective mechanisms controlled by the keys 145. This tabulating key is mounted in the support 81 adjacent the keys of the series 145, and its stem is connected to an arm 237 which is similar to the arms 163, and which is pivotally supported intermediate its ends by means of the support 164, so that its free extremity 238 is located adjacent the free extremity of the arm 186, which latter is secured to the support 182, so that when rocked, the support will also be rocked. The extremity 238 of the arm 237 is provided with a projection 239, which extends below and is normally held out of engagement with the arm 186 by means of a spring 240ª. Thus it will be seen that when the tabulating key 236, or any of the keys of the series 145 are actuated, the escapement arms 176, 177 will be rocked about their point of pivotal support 178 to release the motor 170. A stem 240 similar to the stems 151 is connected by one extremity to the arm 237 and passes through a sleeve 241 similar to the sleeves 153, and which sleeve 241 is rotatably mounted in the support 152. The sleeve 241 is provided with a segment 242, which is adapted to engage spaced ribs or projections 243 on a sleeve 244 similar to the sleeve 148 and a gear 245 is connected with the sleeve 244. The sleeve 244 and gear 245 are mounted upon the shaft 147 for rotation therewith and for adjustment longitudinally with respect to the shaft in a manner similar to the gears 150. This gear 245 is of the mutilated type, and is provided with teeth 246, any number of which may be provided according to the distance it is desired to return the typewriter carriage 115. In the present exemplification of the invention, this gear is shown as being provided with twenty teeth (see also Fig. 13), which are adapted to mesh with a gear 247 on a stub shaft, which latter is arranged below and parallel with the shaft 147, and journaled in a suitable bearing 248 mounted preferably upon the support 133. Secured to and for rotation with the gear 247 is a bevel gear 249, which latter meshes with the bevel gear 250, and this bevel gear 250 is secured to a shaft 251 arranged to extend to a point in the rear of the typewriter carriage, and is journaled in suitable supports 252 (see also Fig. 10).

The gear 245 is adapted to be shifted longitudinally on the shaft 147, to such a position that the teeth thereon will mesh with the gear 247 (see particularly Figs. 13 and 21) in a manner similar to the manner in which the gears 150 are shifted, such as by means of a spring 253, one end of which is connected to a fixed support 254, and the other end to an arm or projection 255 on the sleeve 241, so that when the pin or projection 256 on the stem 240 is moved out of the notch 257 in the sleeve, in the same manner that the pin or projection 162 is moved out of the notch 161 of the sleeve 153, then the spring 253 will act to rotate the sleeve 241 in one direction. The sleeve is rotated in the opposite direction and the sleeve 244 and gear 245 returned to the position shown in Fig. 13, by means of an arm 258, similar to the arms 159, and which arm is secured to the rock shaft 160 to engage a pin or projection 259 on the sleeve 241 similar to the projection 158 on the sleeve 153.

Arranged at the rear of the typewriter and parallel with the upright shaft 123 is another upright shaft 260 (see Figs. 1 and 4), and secured to this shaft is a gear 261 which meshes with the gear 125. A bevel gear 262 is secured to the lower end of shaft 260, and this gear in turn meshes with a gear 263 on the shaft 264, which latter shaft is journaled in suitable supports 265 mounted on the base 35. The shaft 264 is arranged at right angles to the upright shaft 260, and extends to a point adjacent the extremity of the shaft 251, and is connected with the shaft 251 for rotation therefrom by means of a gear 266 on the shaft 264 and a gear 267 on the shaft 251. The gears 266 and 267 are arranged with respect to the shaft 260 so that when the shaft 251 is rotated in the manner already set forth from the shaft 147, the shaft 260 will rotate the gear 125 to give the carriage 115 a return movement. This direction of rotation of the gear 261 will cause the gear 125 to rotate independently of the shaft 123 and the pawl 228 to ride back over the ratchet 226 of the gear 125. After the typewriter carriage has been thus returned the gear 245 will be released and automatically shifted to a position so that it will not engage and mesh with the gear 247.

In order that the uprights 230 and 231 may be adjusted so as to vary the time of engagement of the dog or pawl 224 therewith to unlock the gear 122, the base 232 may be made adjustable in any suitable manner, but preferably by providing a slot 268 (see Fig. 5) in the base coöperating with which is a fastening device 269 (see Fig. 1) in the form of a bolt or fastening screw, which latter may be loosened to permit the base to be adjusted, and when the base is adjusted, the fastening device may be tightened again to hold the parts in their adjusted positions.

As has already been stated, the shaft 147 is driven a complete revolution on each step of movement of the motor 170. This motor is connected by means of the gear 172, already described, to the pinion 173 on the shaft 147. The gear ratio between the gear 172 and the pinion 173 is such that on each step of movement of the gear 172, the pinion 173 is rotated once. To control the gear 172 in its steps of movement, the escapement mechanism, already referred to, and including the escapement arm 177, is provided. A number of pins 175, which number, in this instance, corresponds to the number of steps of rotation of the gear 172, are provided for coöperation with the arm 177, there being, in this instance, five pins. In order to permit the gear 172 to rotate, the arm 177, which normally engages a pin 175, is moved out of position by one of the numeral keys 145, or by the operation of any of the tabulator keys 236, to allow the pin to escape.

In order to limit the movement of the gear 172, after it has moved a sufficient amount, to rotate the shaft 147 a full revolution, the arm 177 is moved into the path of the next approaching pin, and this is accomplished by the arm 258, which has already been referred to as rigidly mounted on the shaft 160, which shaft 160 is rocked, as has already been set forth, by the cams 194. Connected to the arm 258 is a link 270 which, by a pin-and-slot connection with the arm 176, moves said arm 176, and, on account of the rigid connection of this arm 176 with the arm 177, the arm 177 is also moved to a position in front of the advancing pin; the timing of the parts being such that the arm 258 is moved in time to position the arm 177 in front of said advancing pin 175, to stop the motor at the end of one step of movement of the gear 172. This action is repeated on the depression of each key, the gear 172 making one-fifth of a rotation each time a key is depressed. In this connection, it will be noted that the cams 194, arms 195, shaft 160, arm 258 and link 270 constitute, in effect, part of the escapement mechanism, in so far as their manner of functioning is concerned.

In Fig. 25, there is shown a modified form of connection between the shaft 123 and the arm 118, so that the shaft 260 may be dispensed with. In this form of the invention, the shaft 123 is provided with a gear 274 at the upper end thereof, which is fixed to the shaft, and this gear 274 corresponds with the gear 125, as in Fig. 1. The shaft 251 is provided with a gear 275, which meshes with a gear 276 secured directly to the shaft 123. The gear 277 in this form of the invention corresponds with the gear 122 in the other form, and this gear 277 is loosely mounted on the shaft 123. A collar 278 similar to the collar 220 is secured to the gear 277, and an arm 279 is fastened on the shaft 123. This arm projects beyond both sides of the shaft and pivotally mounted upon each extremity of the arm is a dog 280, one end of which is adapted to coöperate with a shoulder 281 on the sleeve or collar 278. The free extremities 282 of the dogs preferably project beyond the periphery of the gear 277, and a spring 283 is provided for holding the end of the dog in engagement with the periphery of the collar 278. Supported by the arm 118 is a projection 284, and this projection 284 is provided with a projection 285, preferably in the form of an anti-friction roller, and this projection 285 is arranged to assume a position within the path of movement of the free extremity 282 of the dogs 280.

In this form of the invention, as the typewriter carriage advances, a rotary motion will be imparted to the shaft 123, and this in turn will rotate the gear 277 through the medium of the dog 280 engaging the shoulder 281 on the sleeve 278. By the time the typewriter carriage has advanced nine steps, the segment 121 will have assumed the position shown in Fig. 25, with reference to the gear 277, that is to say, will have assumed a position that the projection 285 will stand within the path of a further movement of the extremity 282 of the adjacent dog 280. As the typewriter carriage starts to make its tenth step of advancement, the gear 277 will correspondingly be rotated, and this will advance the segment 121 on the arm 118 so that the dog 280 will be tripped by the projection 285 and thereby release the gear 277, so as to permit the shaft 123 to turn with the tenth step of advancing movement of the typewriter carriage until the extremity 282 of the dog 280 passes the projection 285. After the gear is thus released, the arm 118 will be moved in the opposite direction by the spring 233 to return the carriage 46 and to move the projection 285 away from the dogs 280, so that when the typewriter carriage again begins to advance, the projection 285 will correspondingly advance toward the approaching dog 280 to trip the latter.

The totalizers 38 comprise a plurality of number bearing members or wheels 286, around the periphery of which two series of numbers are arranged, and these series of numbers are differentiated from each other preferably by different colors. The numbers of one series alternate with those of the other series, and are so arranged with respect to the numbers of the other series, that when two adjacent numbers are added together in one direction, their sum will be nine, and when added together in the opposite direction, their sum will be ten.

Secured to one side of each of the number wheels 286 (see Fig. 24) is a gear 287, each of which meshes with one of the gears 57. Secured to the opposite side of each of the number wheels is a disk 288 which is provided with a tooth or projection 289 extending beyond the periphery thereof (see Fig. 28), and is for the purpose of carrying a number from one of the number bearing members to the next adjacent number wheel of a higher denomination. These members 288 are so arranged that the tooth or projection 289 thereon will, when the respective number wheels cross the zero point, engage the gear 57 of the next adjacent number wheel.

In order to hold the gears 57 in proper position when not in operation, there is provided a star wheel 292 (see Fig. 8), one of which is secured to each of the gears 57, and a spring-controlled dog or pawl 293 coöperates with the star wheel and will yield when power is applied to the gear 57.

In the form of totalizer just described, the carrying takes place from one of the number wheels to the next adjacent number wheel by means of the member 289 and the gear 57 of the next adjacent number wheel, and the locking members 64 are provided to hold the members in proper position.

In the form of totalizer shown in Figs. 27 to 30, the number wheels 294 are provided on one side with a gear 295, which is secured to the respective wheels 294 and for rotation therewith. A series of gears 296 are supported below the gears 295 and in such position that one of the gears will mesh with each of the gears 295. Arranged to one side of the gears 296 are a plurality of gears 297 which mesh with the respective gears 296. A star wheel 298 is secured to each of the gears 297, and a yielding dog 299 coöperates with these star wheels to hold the gears 297 in proper position, when not operating. The carrying disk or member 288 in this form of the invention, which is provided with a tooth or projection 289, is secured to a star wheel 298, and the members 62 are adapted to engage the gears 297 as the carriage 46 advances with the totalizer operating mechanism.

When the operating gear 56 is in position to engage one of the gears 297 to actuate the number wheels 294 other than the number wheels of the highest denomination of the respective totalizers, the members 62 will engage the gears 297, and the carrying from one of the number wheels of the totalizer to the next number wheel of a higher order will take place as follows:

As the totalizer number bearing member of the lower order crosses the zero point, the tooth or projection 289 on the member 288 will rock the next adjacent member 62 by its engagement with the tooth on the member. The rocking movement of this member 62 will impart one step of rotation to the gear 296 of the next adjacent number bearing member of a higher order, and this step of movement will be imparted from the member 62 to the gear 297 and from this gear 297 to the number bearing member through the medium of the connecting gears 296, 295. In this form of the invention it will be apparent that the members 62 also serve as carrying mechanisms.

Briefly stated, the operation of the complete machine is as follows:—

Having decided which of the totalizers 38 on which it is desired to register the amounts, the proper key 87 is first actuated so as to render the operating gear 56 for that totalizer active by shifting the gear 56 longitudinally on the shaft 50 into such a position that when the shaft 51 is shifted bodily to move the gear 56 toward the totalizers, the gear 56 will mesh with one of the gears 57 on the totalizer. After this operation has been completed, and the paper placed in the typewriter machine in the ordinary and well known manner, the operator can then depress or actuate any one of the series of keys 145, according to the number which it is desired to register. The depression of this key will first release the motor 170 by rocking the support 182, (Fig. 21) which will move the escapement arms 176, 177 in a direction to release the motor 170, so that it will make one step of rotation and then stop. As the motor begins to move, the gear 172 thereon will start to rotate the shaft 147 (Fig. 19). The first portion of the rotation of the shaft 147 will cause the cams 192 to engage and rock the arms 189, and this rocking movement will be imparted to the shaft 111 through the medium of the links 190 and arms 191. As the shaft 111 is rocked, the arms 112 will move the member 113 against the cam faces 109 of the arms 102 (see Figs. 8, 17 and 20) and this in turn will rock the frame comprising the supports 52 and the connecting member 53, and which frame forms a support for the shaft 51 (Fig. 8), on which the operating gears for the totalizers are mounted, and the members 62 which lock the totalizers against overthrow. Just at the time that the gears 56 are brought in mesh with the respective gears 57 of the totalizers, the locking bar 219 will have assumed a position to lock the actuated key against return, and also to lock the remaining keys against actuation (Figs. 8 and 13). The actuation of the key of the series 145 will also release the respective sleeve 153 and the corresponding mutilated gear 150 will be shifted longitudinally on the shaft 147 into a position such that the teeth thereon will engage the respective gear 146 on the shaft 131. A further rotation of the motor will cause the mutilated gear which has been rendered active to rotate the shaft 131, and this rotary motion will be imparted to the drum or cylinder 127 through the medium of the connecting gears shown in Fig. 23, the direction of rotation of the drum 126 being controlled by the clutch member 143, which latter may be shifted by the lever 144 at the will of the operator, and according to the nature of the work to be registered on the totalizer, that is to say, if the number is being added to the amount already on the totalizer, then the drum 127 is adjusted to be rotated in one direction, and the result will be indicated by one of the series of figures on the number wheels, for instance, in black. If, on the other hand, the amount to be registered on the totalizer is to be subtracted from the amount already thereon, and if the result of such subtraction should show a deficit, then the result will be indicated in the other series of figures, or the red series. The manner of indicating which of the series is to be considered forms no part of the present invention, and is therefore not described specifically. Suffice it to say that a shield or indicator is employed, which is automatically shifted so as to indicate one or the other of the series of figures. By depressing one of the series of keys 145, the corresponding key of the series 212 on the typewriter is actuated, and the actuation of this key on the typewriter will record the corresponding amount on the paper on the typewriter carriage, in the ordinary and well known manner, and the typewriter carriage will be advanced one step, in the usual manner, after the record has been made. After the number has been registered by the computing mechanism, the cam 192 on the shaft 147 will have assumed a position to permit the spring 193 to act on the arms 191 to rock the shaft 111 in the opposite direction. This movement of the shaft 111 will cause the arms 112 to be rocked in the opposite direction, so that the member 113 supported by these latter arms will be moved into the reduced portion 108 of the aperture 106 in the arms 102. A further movement of the arms 112 in the same direction will cause the frame comprising the support 52 and the connecting member 53 to be rocked about the shaft 50 in the opposite direction to move the gears 56, and any of the locking members 62 which have been in mesh with the gears 57, out of mesh with these gears so as to permit the carriage 46 and the supported mechanism to advance one step. The shaft 147 makes one complete revolution, and then stops, and during the cycle of movement of this shaft, the calculation takes place. After the calculation has been completed, the cam 205 will have assumed a position to engage the arm 204 to rock the arm 201 and move the projection 203 against the dog 198 to rock the latter about its point of pivotal support and thereby move its extremity 200 into engagement with the star wheel 197 on the shaft 131 to lock the latter against overthrow. As the arms 189 move in the opposite direction under the influence of the springs 193, the key locking member 219 will be moved out of operative position and the actuated key will be released so as to permit the gear 150 to be shifted longitudinally on the shaft 147 out of active position. Just at the completion of the calculation, and just at the time the motor is completing its step of rotation, the cam 194 on the shaft 147 will have assumed a position to engage the arms 195 on the shaft 160, so as to rock the shaft, and move one of the arms 159 into engagement with the respective projection 158 on the sleeve 153 to rotate the sleeve and shift the gear 150 into an inoperative position. This movement of the shaft 160 will cause the escapement arms 176, 177 to be rocked in the opposite direction about their point of pivotal support 178 through the medium of the link 270, which is connected to the arm 258 and also to one of the escapement arms.

When the gear 150 is rendered active, or shifted into an operative position with respect to the gear 146, the projection 215 on the gear will be in a position to engage one extremity of one of the arms 213 to rock the latter about its support, thereby actuating the corresponding key of the series 212 on the typewriter. The actuation of this key, as has before been stated, will produce a record and will cause the typewriter carriage 115 to make one step of advancing movement.

The operation just above described may be repeated until the carriage 46 has been advanced nine steps by the corresponding advancement of the typewriter carriage 115. On the tenth step of advancing movement of the typewriter carriage, the gear 122, the locking dog 224 and the sleeve 220, which are rotated by the shaft 123, will have assumed such positions that on the tenth step of advancement of the typewriter carriage, the dog will be tripped and the gear 122 will be released or unlocked from the shaft 123. During the advancing movement of the typewriter carriage, the arm 118 will be moved so as to create a tension on the elastic member 233 so that the moment the gear 122 is unlocked or released with respect to the shaft 123, the tension of the elastic member 233 will be exerted on the arm 118, and will swing the arm about its pivot in the opposite direction. This movement will return the carriage 46 to its normal or starting position, that is to say, so that the gears 56 on the shaft 51 will be adjacent the gears 57 of the number bearing members of the highest denomination of the respective totalizers. This return movement of the carriage 46 takes place simultaneously with the tenth step of advancing movement of the typewriter carriage.

When it is desired to produce a record on the paper without actuating the calculating mechanism this may be accomplished by manipulating the keys of the series 212, and the operation of these keys in this manner will in no manner affect the calculating mechanism. In other words, the keys of the series 212 may be actuated independently with respect to the calculating mechanism, and in the same manner as though the attachment were not applied to the machine.

When it is desired to render any one or more of the totalizers inactive after they have once been rendered active, all that is necessary is to operate the bar or member 100 101, and the operation thereof will rock the shaft 94 (see Fig. 8) to shift the bar or member 91 so that the shouldered portions thereof will engage the projections 88 on the sleeves 75 to rotate the sleeves so as to position the notches 76 therein to receive the pins or projections 77 and the elastic members 72 will then operate to return the keys 87. As the carriage 46 advances, the ends of the stems or members 69, as well as the ends of the stems or members 97, will advance with respect to their connections with the keys.

In order to tabulate with this mechanism, it is necessary to return the carriage of the typewriter to a predetermined point or column after the carriage has started to advance.

In order to accomplish this, the tabulating key 236 is provided, and this tabulating key comprises a selective mechanism comprising the mutilated gear 245 (see Figs. 10 and 21) having the desired number of teeth, and which gear is adapted to be shifted longitudinally on the shaft 147 in the same manner in which the gears 150 are shifted. When the gear 245 is shifted by the key 236, the gear will be positioned so that its teeth will engage and mesh with the gear 247, and the motion of this gear 247 will be imparted to the gear 249 to rotate the shaft 251 through the medium of the gear 250. The rotation of this shaft 251 will rotate the upright shaft 260 (see Figs. 1 and 4) and the gear 261 will rotate the gear 125 in the direction opposite to the direction of rotation imparted to it by the rack 126 in the step-by-step letter feeding movement of the carriage, the pawl and ratchet connection 228, 226 between the gear 125 and the shaft 123 permitting such rotation. As the gear 125 is rotated in the opposite direction, the typewriter carriage will be retracted, or a retrograde movement will be imparted thereto. The distance of the return movement of the carriage 115 is controlled by the number of teeth on the mutilated gear 245.

In the present form of the invention, the motor 170 is shown and described as being a spring motor in which the power is stored, and is spent as the motor is intermittently operated, and in order that the motor may be automatically wound when its power has been substantially spent, suitable automatic winding mechanism may be provided, but the specific construction and operation of this winding mechanism constitutes no part of the present invention. Suffice it to say that there may be provided an electric motor 300 (see Fig. 3) which is connected to a gear 301 on the shaft of the motor 170. The motor 170 comprises a casing in which is arranged a coil spring (shown more clearly in Fig. 20), one extremity of the spring being secured to the motor casing and the other extremity being secured to the shaft of the motor. The casing of the motor is locked to the shaft by means of a pawl and ratchet connection 302, 303, so that when the shaft of the motor is rotated by the gear 301, the pawl 302 will yield to permit the spring to be wound up. The electric motor 300 is controlled by a switch 304, and this switch is adapted to be actuated by means of a train of gears 305, and which train of gears receives its motion from a gear 306 on the shaft 147. The operating mechanism for the switch 304 is so arranged that just as the power in the spring motor is about spent, the switch will be closed by the cam 305ᵃ to start the motor 300. When the spring in the motor 170 is wound, the switch 304 will again be opened by a spring 304ᵃ to throw the motor 300 out of commission.

Certain features disclosed in this application are also disclosed and broadly claimed in my prior applications, Serial No. 236,498, filed December 12, 1904; Serial No. 302,845, filed February 26, 1906; and Serial No. 504,595, filed June 26, 1909. Application Serial No. 236,498 is directed, among other things, to a series of column totalizers, a cross-totalizer, a grand-totalizer and reversing mechanism for the totalizers. The drawings in said application No. 236,498 are for the most part substantially duplicated in the patent to Wahl, No. 893,717 dated July 21, 1908. Application Serial No. 302,845 is directed, among other things, to a different arrangement of column totalizers and cross and grand-totalizers from that disclosed in application No. 236,498. Application Serial No. 504,595 is directed, among other things, to the feature of a motor and key-controlled mutilated gears for permitting different degrees of rotation of the computing mechanism under the control of the motor, and also the means whereby any totalizer may be rendered effective at will. In the present application, I do not claim any of the features common to this application and any of the above-mentioned applications, the claims in this case being restricted to features not disclosed in said applications.

What I claim is—

1. In a typewriter calculating machine, the combination of typewriting mechanism embodying a frame, numerical keys, a calculating mechanism embodying a plurality of totalizers fixed with respect to said frame, and means for controlling any one or all of said totalizers by said keys at any point in the writing line, and one or more times in the same writing line.

2. In a typewriter calculating machine, the combination of typewriting mechanism embodying numerical keys, a frame, and a traveling carriage determining the point in the line where the printing occurs, a calculating mechanism embodying a plurality of totalizers fixed with respect to said frame, and means for actuating any one or any group of said totalizers by said keys in any and every position of said carriage either at the same time or at different times in a writing line.

3. In a calculating device adapted for attachment to a typewriting machine having type-keys, the combination of a plurality of registers each embodying a plurality of number wheels, selector mechanisms for rendering one or more of said registers active, selector mechanisms common to the number wheels of a plurality of registers, keys individual to the last said selector mechanisms for controlling the latter, and means whereby the operation of the last said keys will actuate the respective typewriter keys.

4. In a calculating device adapted for attachment to a typewriting machine having type-keys, the combination of a totalizer embodying a plurality of number bearing wheels, selector mechanisms individual to said wheels, said selector mechanisms each embodying engaging and disengaging fixed and adjustable rotatable elements, keys individual to said selector mechanisms for causing the elements to engage, means for rotating said elements, and means individual to said selector mechanisms for actuating the respective typewriter keys when said selector mechanisms are active, and for permitting an independent actuation of the typewriter keys.

5. In combination, a frame, a register fixed with respect thereto, comprising number bearing members, actuating mechanism for the register movable toward and away from the number bearing members into and out of operative positions, a typewriter carriage, and means for moving the actuating mechanism with relation to the register to present the actuating mechanism to different number bearing members in any position of said carriage, and independent of said carriage.

6. In combination, a register comprising alined number bearing members, actuating mechanism for the register, normally disengaged from said members, means for advancing the actuating mechanism to successive number bearing members, while the said actuating mechanism is disengaged from said members, and means for moving said actuating mechanism laterally into engagement with said members.

7. In a calculating device adapted for attachment to a typewriting machine having a key-controlled escapement carriage, and keys, the combination of a register comprising number bearing members, a computing carriage, actuating mechanism for the register carried thereby, means connecting said mechanism with the key controlled escapement carriage of the typewriter for advancement thereby, key controlled mechanism for controlling the said actuating mechanism, and means also actuated by the said key controlled mechanism for actuating the typewriter keys.

8. In a calculating device adapted for attachment to a typewriting machine having a typewriter carriage, and keys, the combination of a register comprising number bearing members, a computing carriage, actuating mechanism for the register carried thereby, means connecting said carriages to advance simultaneously, selector mechanisms for controlling the operation of said actuating mechanism, operating connections between the selector mechanisms and the respective keys of the typewriter and keys individual to the selector mechanisms for controlling the latter.

9. In a calculating device adapted for attachment to a typewriting machine having a typewriter carriage, and keys, the combination of a register comprising number bearing members, a computing carriage, actuating mechanism carried thereby for the register, means for moving the said computing carriage to hold said actuating mechanism in and out of actuating positions, a key controlled escapement for the carriage of the typewriter for advancement thereby, selector mechanisms for controlling the said actuating mechanism, connections between the selector mechanisms and the respective keys of the typewriter, keys individual to the selector mechanisms for controlling the latter, and means for disconnecting said computing carriage to permit the independent return thereof.

10. In a calculating device adapted for attachment to a typewriting machine having a typewriter carriage and keys, the combination of a register, comprising number bearing members, actuating mechanism for the register, one of the last two of said parts being fixed and the other relatively movable to advance the said actuating mechanism to successive number bearing members, keys for controlling the said actuating mechanisms, means for actuating the respective keys of the typewriter by the operation of said actuating mechanism, and means for returning said actuating mechanism after said advance actuated by the striking of a predetermined number of keys.

11. In a calculating device having a typewriting mechanism with an escapement carriage and numeral keys, the combination of a plurality of registers each comprising number bearing members, traveling actuating mechanisms individual to the registers and having connection with the escapement carriage of the typewriting mechanism for advancement thereby, means for controlling said actuating mechanisms, and means whereby the operation of said actuating mechanisms will actuate the respective numeral keys of the typewriting mechanism, said numeral keys being also operable independently with respect to said actuating mechanisms.

12. In a calculating device, the combination with a typewriting machine having an escapement carriage and numeral keys, of a plurality of registers each comprising number bearing members, traveling actuating mechanisms individual to the registers and having connection with the escapement carriage of the typewriting machine for advancement thereby, means common to all of said actuating mechanisms for controlling the latter, and means whereby the operation of said mechanisms will actuate the respective keys of the typewriter, said typewriter keys being also operable independently with respect to said mechanisms.

13. In a calculating device, the combination with a typewriting machine having an escapement carriage and numeral keys, of a plurality of registers, each comprising a plurality of number bearing members, traveling actuating mechanisms individual to the registers and having connection with the escapement carriage, selector mechanisms for rendering one or more of the said actuating mechanisms active, controlling means for operating said actuating mechanisms, and operating connections between said controlling means and the respective numeral keys of the typewriting machine for actuating the latter, said numeral keys being adapted for movement independently with respect to said connections.

14. In a calculating device, the combination with a typewriting machine having an escapement carriage and numeral keys, of a plurality of registers, each comprising a plurality of number bearing members, traveling actuating mechanisms individual to the registers and having connection with the escapement carriage, selector mechanisms for rendering one or more of the said actuating mechanisms active, controlling means for operating said actuating mechanisms, operating connections between said controlling means and the respective numeral keys of the typewriting machine for actuating the latter, said numeral keys being adapted for movement independently with respect to said connections, and means for rendering inactive the actuating mechanisms which have been rendered active.

15. The combination of a plurality of registers, traveling actuating mechanisms individual to said registers, means for rendering said mechanisms normally inactive, means common to all of said actuating mechanisms for controlling the latter, and keys individual to said actuating mechanisms for rendering one or more of said mechanisms active.

16. The combination of a plurality of registers, each comprising number bearing members, traveling actuating mechanisms individual to said registers and adapted to advance successively to the number bearing members, when said actuating mechanisms are moved away from the registers, means common to all of said actuating mechanisms for controlling the latter, keys individual to the registers for rendering the respective actuating mechanisms active, and means for moving said actuating mechanisms away from the respective registers.

17. The combination of a plurality of registers, each comprising number bearing members, traveling actuating mechanisms individual to said registers and adapted to advance successively to the number bearing members, when said actuating mechanisms are moved away from the registers, means common to all of said actuating mechanisms for controlling the latter, keys individual to the registers for rendering the respective actuating mechanisms active, means tending to move said actuating mechanisms away from the respective registers, and means for automatically returning the actuating mechanisms from the positions to which they have advanced.

18. The combination of a plurality of registers, each comprising number bearing members, traveling actuating mechanisms individual to the registers, said mechanisms being adapted for advancing movement successively to the number bearing members and also for lateral movement away from the registers to permit the mechanisms to advance, means for displacing the actuating mechanisms relatively to the respective registers, means for locking the mechanisms in the last said position, means for unlocking the mechanisms, and selector mechanisms individual to the mechanisms for positioning the latter to be presented in active positions to the respective registers.

19. The combination of a plurality of registers, each comprising number bearing members, traveling actuating mechanisms individual to the registers, said mechanisms being adapted for advancing movement successively to the number bearing members and also for lateral movement away from the registers to permit the mechanisms to advance, means for displacing the actuating mechanisms relatively to respective registers, means for locking the mechanisms in the last said position, means individual to the said mechanisms for unlocking the latter, and selector mechanisms individual to the mechanisms for positioning the latter to be presented in active positions to the respective registers.

20. The combination of a plurality of registers, each comprising number bearing members, traveling actuating mechanisms individual to the registers, said mechanisms being adapted for advancing movement successively to the number bearing members, and also for lateral movement away from the registers to permit the mechanisms to advance, means for displacing the actuating mechanisms relatively to the respective registers, means for locking the mechanisms in the last said position, means for unlocking the mechanisms, selector mechanisms individual to the mechanisms for positioning the latter to be presented in active positions to the respective registers, and selector mechanisms common to all of said actuating mechanisms for controlling the latter.

21. The combination of a plurality of registers, each comprising number bearing members, traveling actuating mechanisms individual to the registers, said mechanisms being adapted for advancing movement relative to the registers and successively to the number bearing members and also for lateral movement toward and away from the registers to permit the mechanisms to advance, means common to all of said mechanisms for imparting such lateral movements and to which the said mechanisms are relatively moveable, and means common to said actuating means for controlling the latter.

22. The combination of a plurality of registers, each comprising number bearing members, traveling actuating mechanisms individual to the registers, said mechanisms being also movable laterally and away from the registers to permit the actuating mechanisms to advance, means common to said actuating mechanisms for effecting such lateral movement and with relation to which the said mechanisms are adapted to advance, key-actuated mechanisms individual to the actuating mechanisms for rendering the latter active, and additional means common to all of said actuating mechanisms for rendering the same inactive.

23. The combination of a plurality of registers, each comprising number bearing members, traveling actuating mechanisms individual to the registers, said mechanisms being also movable laterally and away from the registers to permit the actuating mechanisms to advance, means common to said actuating mechanisms for effecting such lateral movement and with relation to which the said mechanisms are adapted to advance, key-operated mechanisms individual to the actuating mechanisms for rendering the latter active, and a device common to all of said actuating mechanisms for returning the latter to an inactive position.

24. The combination of a plurality of registers, each comprising number bearing members, traveling actuating mechanisms individual to the registers, said mechanisms being also movable laterally and away from the registers to permit the actuating mechanisms to advance, means common to said actuating mechanisms for effecting such lateral movement and with relation to which the said mechanisms are adapted to advance, keys individual to the actuating mechanisms for rendering the latter active, a plurality of devices common to all of said actuating mechanisms for controlling the latter, and means for automatically rendering inactive the active one of the last recited devices.

25. The combination of a plurality of registers each comprising number bearing members, traveling actuating mechanisms individual to the registers, said mechanisms being also movable laterally and away from the registers to permit the actuating mechanisms to advance, means common to said actuating mechanisms for effecting such lateral movement and with relation to which the said mechanisms are adapted to advance, keys individual to the actuating mechanisms for rendering the latter active, additional driving mechanisms common to all of said actuating mechanisms for controlling the latter, means individual to the last recited mechanisms for automatically rendering the active mechanisms inactive, and means common to all of the last said means for operating the latter.

26. The combination of a plurality of registers, traveling actuating mechanisms individual to the registers and normally out of operative relation with their respective registers, selector mechanisms individual to the actuating mechanisms and movable with the latter, and keys for controlling the selector mechanisms and with respect to which keys the selector mechanisms are relatively movable.

27. The combination of a plurality of registers, traveling actuating mechanisms individual to the registers and normally out of operative relation with their respective registers, depressible keys individual to the mechanisms for controlling the latter and with relation to which keys the actuating mechanisms are relatively movable.

28. The combination of a plurality of stationary registers, traveling actuating mechanisms individual to the registers and normally out of operative relation with their respective registers, selector mechanisms individual to the actuating mechanisms and movable with the latter, keys individual to the selector mechanisms for rendering the latter active, and with respect to which keys the actuating mechanisms are relatively movable, and means for rendering the selector mechanisms inactive.

29. The combination of a plurality of stationary registers, traveling actuating mechanisms individual to the registers and normally out of operative relation with their respective registers, selector mechanisms individual to the actuating mechanisms and movable with the latter, keys individual to the selector mechanisms for rendering the latter active, and with respect to which keys the actuating mechanisms are relatively movable, and means common to all of the selector mechanisms for rendering the selector mechanisms inactive.

30. The combination of a plurality of stationary registers, traveling actuating mechanisms individual to the registers and normally out of operative relation with their respective registers, selector mechanisms individual to the actuating mechanisms and movable with the latter, keys individual to the selector mechanisms for rendering the latter active, and with respect to which keys the actuating mechanisms are relatively movable, means common to all of the selector mechanisms for rendering the selector mechanisms inactive, and an actuator for the last said means with relation to which the said means is relatively movable.

31. The combination of a plurality of stationary registers, traveling actuating mechanisms individual to the registers and normally out of operative relation with their respective registers, keys individual to the selector mechanisms for controlling the latter and with which the selector mechanisms are relatively movable, and additional selector mechanisms common to all of said actuating mechanisms for operating the latter.

32. The combination of a register, a traveling carriage movable relatively to the register, actuating mechanism mounted upon the carriage for movement therewith, selector mechanisms for controlling the operation of the actuating means, said actuating mechanism being also adapted for movement laterally to the carriage and away from the register, and means for imparting such lateral movement to the actuating mechanism.

33. The combination of a register, a traveling carriage movable relatively to the register, actuating mechanism mounted upon the carriage for movement therewith, selector mechanisms for controlling the operation of the actuating means, said actuating mechanism being also adapted for movement laterally to the carriage to connect with the register and away from the register, and means for imparting such lateral movement to the actuating mechanism and with relation to which means the carriage and actuating means are relatively movable.

34. The combination of a plurality of registers, a traveling carriage movable relatively to the registers, actuating mechanisms individual to the registers and mounted upon the carriage for movement therewith, said actuating mechanisms having a plurality of movements relative to the carriage and being normally out of operating relation with their respective registers, means individual to the actuating mechanisms for moving the actuating mechanisms relatively to the carriage for positioning the mechanisms to be presented in operating position to the respective registers and with relation to which means the actuating means is also relatively movable, means also mounted on the carriage and common to said actuating mechanisms for moving the latter out of operating positions, an actuator for the last said means to which the said means and carriage are relatively movable and additional means with relation to which the actuating mechanisms and carriage are relatively movable for imparting another movement of the actuating mechanisms relative to the carriage.

35. In a calculating device adapted for attachment to a typewriting machine having keys and having a reciprocatory typewriting carriage, the combination of a register, a computing carriage connected with said typewriter carriage for advancement thereby, actuating mechanism mounted upon the said computing carriage for movement therewith anl normally ineffective, means for positioning the actuating mechanism to render the same effective, means for imparting operating motion to the said mechanism, and means whereby the keys of the typewriter will be actuate by the operation of said mechanism.

36. In a calculating device adapted for attachment to a typewriting machine having keys and having a reciprocating typewriter carriage, the combination of a register, a computing carriage connected with said typewriter carriage for advancement thereby, actuating mechanism mounted on said computing carriage for movement with the typewriter carriage, key-controlled mechanism for operating the actuating mechanism, and operating connections between the key-controlled mechanism and the keys of the typewriter whereby the operation of the said mechanism will actuate the respective keys of the typewriter, said typewriter keys being adapted for independent operation with respect to the said key-controlled mechanism, and said actuating mechanism being also adapted for movement with relation to the last said mechanism.

37. In a calculating device adapted for attachment to a typewriting machine having keys and a reciprocating carriage, the combination of a register, a computing carriage connected with said typewriting carriage for advancement thereby, actuating mechanism mounted upon said composing carriage for advancement therewith, selector mechanisms including actuating keys for controlling the operation of said mechanisms, said computing carriage and actuating mechanism being movable relatively to the selector mechanisms, and operating connections individual to the selector mechanisms and the respective keys of the typewriter for operating the latter.

38. In a calculating device adapted for attachment to a typewriting machine having keys and a reciprocating carriage, the combination of a plurality of registers, a traveling computing carriage connected t said typewriter carriage for advancement thereby, actuating mechanisms individual to the registers mounted upon the carriage and normally ineffective, selector mechanisms individual to the act ating mechanisms also mounted upon the carriage, keys individual to the selector mechanisms and to which the said mechanisms are relatively movable, additional selector mechanisms common to all of said actuating mechanisms by which the actuating mechanisms are relatively movable to effective positions, and operating connections between the last said selector mechanisms and the respective keys of the typewriter for actuating the latter.

39. In a calculating machine adapted for attachment to a typewriting machine having a reciprocating carriage and typewriting keys, the combination of a register, traveling actuating mechanism, a driving clutch between said carriage and said actuating mechanism for advancing said actuating mechanism along said register, keys, means controlled thereby for driving said actuating mechanism, automatic means for opening said clutch controlled by the total number of said keys struck in writing a line, and means for returning said actuating mechanism independently of said carriage when said clutch is open, whereby when the last number key in the printed line is struck, said actuating mechanism is returned.

40. In a calculating machine adapted for attachment to a typewriting machine having a reciprocating carriage and typewriting keys, the combination of a register, traveling actuating mechanism, a driving clutch between said carriage and said actuating mechanism for advancing said actuating mechanism along said register, keys, means controlled thereby for driving said actuating mechanism, automatic means for opening said clutch controlled by the total number of said keys struck in writing a line, means for returning said actuating mechanism independently of said carriage when said clutch is open, whereby when the last number key in the printed line is struck, said actuating mechanism is returned, and key-controlled means for releasing said actuating mechanism to be returned from any point in the line.

41. In a typewriting calculating machine, the combination of a register, a traveling computing carriage, actuating mechanism mounted thereon for advancement with the said carriage, an oscillatory member, a rack connection between said member and said carriage, an escapement-controlled typewriter carriage, a shaft connected to the carriage for operation thereby, a gear on the shaft, clutch members connecting the gear for rotation with the shaft, a rack on the oscillatory member meshing with the gear, whereby said computing carriage will be advanced by the said typewriter carriage, and means for releasing the gear to permit the typewriter carriage to advance independently with relation to the said computing carriage.

42. In a typewriting calculating machine, the combination of a register, a traveling computing carriage, actuating mechanism mounted thereon for advancement with the said carriage, an oscillatory member, a rack connection between said member and said carriage, an escapement-controlled typewriter carriage, a shaft connected to the said typewriter carriage for operation thereby, a gear on the shaft, clutch members connecting the gear for rotation with the shaft, a rack on the oscillatory member meshing with the gear, whereby said computing carriage will be advanced by the said typewriter carriage, means for releasing the gear to permit the typewriter carriage to advance independently with relation to the said computing carriage, and means for returning the said typewriter carriage.

43. In a typewriting calculating machine, the combination of a register, a traveling computing carriage, actuating mechanism mounted thereon, an oscillatory member, a rack connection between said member and said carriage, an escapement controlled typewriter carriage, a shaft connected to the same for operation thereby, a gear on the shaft, clutch members connecting the gear for rotation with the shaft, a rack on the oscillatory member meshing with the gear, whereby the said computing carriage will be advanced by the typewriter carriage, means for releasing the gear to permit the typewriter carriage to advance independently with relation to the said computing carriage, means for automatically returning the said computing carriage, during the independent advancing movement of the said typewriter carriage, and means for returning the said computing carriage.

44. In a typewriting calculating machine, the combination of a register, a traveling computing carriage, actuating mechanism mounted thereon, an oscillatory member, a rack connection between said member and said carriage, an escapement controlled typewriter carriage, a shaft connected to the carriage for operation thereby, a gear on the shaft, clutch members connecting the gear for rotation with the shaft, a rack on the oscillatory member meshing with the gear, whereby the said computing carriage will be advanced by the said typewriter carriage, means for releasing the gear to permit the typewriter carriage to advance independently with relation to the said computing carriage, means for automatically returning the said computing carriage during the independent advancing movement of the said typewriter carriage, and means for returning the said computing carriage at will and from any point to which it has advanced.

45. In a typewriting calculating machine, the combination of a register, a traveling computing carriage, actuating mechanism mounted thereon, an oscillatory member, a rack connection between said member and said carriage, an escapement-controlled typewriter carriage, a shaft connected to the said typewriter carriage for operation thereby, a gear on the shaft, clutch members connecting the gear for rotation with the shaft, a rack on the oscillatory member meshing with the gear, whereby the said computing carriage will be advanced by the said typewriter carriage, means for releasing the gear to permit the said typewriter carriage to advance independently with relation to the said computing carriage, and means for varying the time at which the gear may be released.

46. In a typewriting calculating machine, the combination of a plurality of registers, a traveling computing carriage, traveling actuating mechanisms individual to the registers mounted upon the said carriage, selector mechanisms individual to the actuating mechanisms, keys individual to the selector mechanism and to which the actuating mechanisms are relatively movable, an escapement controlled typewriter carriage, means connecting the said carriages, and means enabling advancement of one of the carriages with relation to the other.

47. In a typewriting calculating machine, the combination of a plurality of registers, a traveling computing carriage, traveling actuating mechanisms individual to the registers mounted upon the carriage for advancement therewith, selector mechanisms individual to the actuating mechanisms, keys individual to the selector mechanism and to which the actuating mechanisms are relatively movable, an escapement - controlled typewriter carriage, means connecting the said carriages, means enabling one of the carriages to advance independently beyond the limit of the advancement of the other carriage, and means for automatically returning the other carriage during the independent adjustment of the former.

48. In a typewriter calculating machine, the combination of a plurality of registers, a traveling computing carriage, traveling actuating mechanism individual to the registers mounted upon the carriage for advancement therewith, selector mechanisms individual to the actuating mechanisms, keys individual to the selector mechanism and to which the actuating mechanisms are relatively movable, an escapement-controlled typewriter carriage, means connecting the carriages, means enabling advancement of one carriage with relation to the other, and additional selector mechanisms which may drive any of said actuating mechanisms and with relation to which the actuating mechanisms are movable.

49. In a typewriting calculating machine having keys, the combination of a plurality of registers, a traveling computing carriage actuating mechanisms individual to the registers mounted upon the said carriage for advancement therewith, selector mechanisms individual to the actuating mechanisms, keys individual to the selector mechanism and with relation to which the actuating mechanisms are relatively movable, an escapement controlled carriage, means connecting the said carriages for advancement in unison, means enabling advancement of one carriage with relation to the other, additional selector mechanisms adapted to actuate any of said actuating mechanisms and with relation to which the actuating mechanisms are movable, and operating connections between the last said selector mechanisms and the said keys of the typewriter for actuating the latter.

50. In a typewriter calculating machine, the combination of a register comprising number bearing members, operating gears for said members, actuating mechanism for the members, a traveling computing carriage upon which said mechanism is mounted, an escapement controlled carriage, means connecting the carriages for advancement in unison to present said actuating mechanism successively to the said gears, said means enabling a relative movement of the carriages, and means for moving the actuating mechanism away from the register to permit the actuating mechanism to advance, said actuating mechanism being movable relatively to the last said means.

51. In a calculating device, the combination with a typewriting machine having an escapement carriage, of a register comprising number bearing members, actuating mechanism movable relatively to the members for operating the latter, a traveling carriage on which the actuating mechanism is mounted, means connecting the carriage with the escapement carriage of the typewriting machine for advancement thereby a distance equal to the length of the register, said means enabling the escapement carriage to advance independently with respect to said traveling carriage when the latter reaches the limit of its advancement, means for automatically releasing said traveling carriage when the latter reaches the limit of its advancing movement to permit the escapement carriage to advance independently and beyond said limit, means for automatically returning said traveling carriage when the latter is thus released, and means for automatically returning the escapement carriage.

52. In a calculating machine, including a typewriter having an escapement carriage, the combination of a register embodying number bearing members, a set of gears for imparting rotation to the said number bearing members, an operating gear for imparting rotation to the first said gears, a carriage upon which the operating gear is mounted, means connecting said carriage to an escapement carriage of the typewriter for advancement thereby successively to the first said gears, and for movement relative to the escapement carriage, and means relative to which the operating gear is movable for throwing the latter gear out of mesh with the first said gears in a direction transverse to the axis of said gear.

53. In a calculating machine, the combination of a register embodying number bearing members, a set of gears for imparting rotation to the said number bearing members, a traveling operating gear for imparting rotation to the first said gears, means for positioning the traveling gear for operating the first said gears successively, and means for throwing the operating gear out of actuating position in a direction transverse to its axis, said operating gear being adapted for movement relatively to the last said means.

54. In a calculating machine, the combination of a plurality of registers, each embodying number bearing members, a set of gears for imparting rotation to the respective number bearing members, traveling gears individual to the registers for imparting rotation to the first said gears successively, means individual to the traveling gears for positioning the latter for operating the first said gears, and means for throwing the operating gears out of operating positions in a direction transverse to the axes, said operating gears being adapted for movement relatively to the last said means.

55. In a calculating machine, the combination of a plurality of registers, each embodying number bearing members, a set of gears for imparting rotation to the respective number bearing members, traveling gears individual to the registers for imparting rotation to the first said gears successively, means individual to the traveling gears for positioning the latter for operating the first said gears, and means in connection with all of said operating gears for throwing the latter out of operating positions in a direction transverse to their axes and with respect to which means the operating gears are relatively movable.

56. In a calculating machine, the combination of a plurality of registers, each embodying number bearing members, a set of gears for imparting rotation to the said number bearing members, traveling actuating gears individual to the registers for imparting rotation to the respective first said gears successively, selector mechanisms individual to the actuating gears and each including an actuator with relation to which the selector mechanisms are movable, and means adapted to connect with any of said traveling gears for throwing the latter out of operating positions in a direction transverse to their axes and with respect to which means the traveling gears are relatively movable.

57. In a calculating machine, the combination of a plurality of registers each embodying number bearing members, a set of gears for imparting rotation to the said number bearing members, traveling actuating gears individual to the registers for imparting rotation to the respective first said gears successively, selector mechanism individual to the actuating gears and each including an actuator with relation to which the selector mechanisms are movable, means for throwing any of said traveling gears out of operating positions in a direction transverse to their axes and with respect to which means the traveling gears are relatively movable, and additional selector mechanisms adapted to connect with any of said traveling gears for controlling the rotation thereof.

58. In a calculating machine, the combination of a plurality of registers each embodying number bearing members, a set of gears for imparting rotation to the said number bearing members, traveling actuating gears individual to the registers for imparting rotation to the respective first said gears successively, selector mechanisms individual to the actuating gears and each including an actuator with relation to which the selector mechanisms are movable, means in connection with said traveling gears for throwing the latter out of operating positions in a direction transverse to their axes and with respect to which means the traveling gears are relatively movable, and additional selector mechanisms common to all of said traveling gears for controlling the rotation thereof and with relation to which the gears are movable.

59. In a calculating machine, the combination of a plurality of registers each embodying number bearing members, a set of gears for imparting rotation to the said number bearing members, traveling actuating gears individual to the registers for imparting rotation to the respective first said gears successively, selector mechanisms individual to the actuating gears and each including an actuator with relation to which the selector mechanisms are movable, means in connection with said traveling gears for throwing the latter out of operating positions in a direction transverse to their axes and with respect to which means the traveling gears are relatively movable, additional selector mechanisms in connection with said traveling gears for controlling the rotation thereof and with relation to which the gears are movable, and means for automatically rendering the last said selector mechanisms inactive.

60. In a calculating machine, the combination of a register embodying number bearing members, a set of gears for imparting rotation to the said number bearing members, a traveling actuating gear adapted to be advanced to operate the first said gears successively, toothed members supported for oscillating movement and adapted to be advanced with the actuating gear to successively engage the first said gears, and means for shifting said actuating gear and members into and out of position to mesh with the first said gears and in a direction transverse to the axis of the last mentioned gears.

61. In a calculating machine, the combination of a register embodying number bearing members, a set of gears for imparting rotation to the said number bearing members, a traveling actuating gear adapted to be advanced to operate the first said gears successively, toothed members supported for oscillating movement and adapted to be advanced with the actuating gear to successively engage the first said gears, means for shifting said actuating gear and members into and out of position to mesh with the first said gears and in a direction transverse to the axis of the last mentioned gears, said operating gear and members being movable relatively to the said means.

62. In a calculating machine, the combination of a register embodying number bearing members, a set of gears for imparting rotation to the number bearing members, a traveling actuating gear adapted to be advanced to operate the first said gears successively, toothed members supported for oscillating movement and adapted to be advanced with the actuating gear to successively engage the first said gears and to be oscillated from said gears, and mechanism for shifting the actuating gear and the toothed members into and out of position to mesh with the first said gears, and with respect to which mechanism the actuating gear and toothed members are relatively movable.

63. In a calculating machine, the combination of a register embodying number bearing members, a set of gears for imparting rotation to the said number bearing members, a traveling actuating gear adapted to be advanced to operate the first said gears successively, toothed members supported for oscillating movement and adapted to be advanced with the actuating gear to successively engage the first said gears and to be oscillated from said gears, in one direction, and mechanism for shifting the actuating gear and the toothed members into and out of position to mesh with the first said gears, and with respect to which mechanism the actuating gear and toothed members are relatively movable, said mechanism including means for moving the toothed members in the opposite direction.

64. In a calculating machine, the combination of a register embodying number bearing members, a set of gears for imparting rotation to the said number bearing members, a traveling actuating gear adapted to be advanced to operate the first said gears successively, pivotally supported toothed members adapted to be advanced with the actuating gear to successively engage the first said gears and to be moved by said gears about their pivots in one direction, and mechanism for shifting said actuating gear into and out of position to mesh with the first said gears, said mechanism including means for limiting the movement of the toothed members by the register gears, and for moving the toothed members about their pivots in the opposite direction.

65. In a calculating machine, the combination of a register embodying number bearing members, a set of gears for imparting rotation to the said number bearing members, a traveling actuating gear adapted to be advanced to operate the first said gears successively, pivotally supported toothed members adapted to be advanced with the actuating gear to successively engage the first said gears and to be moved by said gears about their pivots in one direction, and mechanism for shifting said actuating gear into and out of position to mesh with the first said gears, and in a direction transverse to the axes of said actuating gear and members, said mechanism including means for limiting the movement of the toothed members by the register gears, and for moving the toothed members about their pivots in the opposite direction.

66. In a calculating machine, the combination of a register embodying number bearing members, a set of gears for imparting rotation to the said number bearing members, a traveling carriage, an actuating gear mounted on the carriage for advancement thereby to operate the first said gears successively, a supporting structure on the carriage mounted for pivotal movement relative thereto, toothed members supported by the said structure and for pivotal movement relative to the structure, and adapted to be advanced with the actuating gear to successively mesh with the first said gears and to be moved about their pivots in one direction by the gears, and means for rocking the said supporting structure about its pivot and relatively to the carriage to move the actuating gear and toothed members away from the first said gears and in a direction transverse to the axis of said actuating gear and members.

67. In a calculating machine, the combination of a register embodying number bearing members, a set of gears for imparting rotation to the number bearing members, a traveling carriage, an actuating gear mounted on the carriage for advancement thereby to operate the first said gears successively, a supporting structure on the carriage mounted for pivotal movement relative thereto, toothed members supported by the said structure and for pivotal movement relative to the structure and adapted to be advanced with the actuating gear to successively mesh with the first said gears and, to be moved about their pivots in one direction by the gears, and means for rocking the said supporting structure about its pivot and relatively to the carriage to move the actuating gear and toothed members away from the first said gears and in a direction transverse to the axis of said actuating gear and members, said mechanism including means for moving the toothed members about their pivots in the opposite direction.

68. In a calculating machine, the combination of a register embodying number bearing members, a set of gears for imparting rotation to the said number bearing members, a traveling carriage, a supporting structure mounted thereon and for relative pivotal movement, an actuating gear supported by the structure and adapted to be advanced therewith to successively operate the first said gears, toothed members pivotally mounted upon the said structure and adapted to be advanced with the actuating gear to successively engage the first said gears to be rocked thereby, a plurality of members individual to the toothed members and pivotally mounted upon the said supporting structure, the last said members having loose connections with the respective toothed members, and means coöperating with the second said members for rocking the said supporting structure about its pivot to move the actuating gear and toothed members away from the first said gears in a direction transverse to the axis of the actuating gear and toothed members.

69. In a calculating machine, the combination of a register embodying number bearing members, a set of gears for imparting rotation to the said number bearing members, a traveling carriage, a supporting structure mounted thereon and for relative pivotal movement, an actuating gear supported by the structure and adapted to be advanced therewith to successively operate the first said gears, toothed members pivotally mounted upon the said structure and adapted to be advanced with the actuating gear to successively engage the first said gears to be rocked thereby, a plurality of members individual to the toothed members and pivotally mounted upon the said supporting structure, the last said members having loose connections with the respective toothed members, and means coöperating with the second said members for rocking the said supporting structure about its pivot to move the actuating gear and toothed members away from the first said gears in a direction transverse to the axis of the actuating gear and toothed members and with respect to which means all of the parts are relatively movable.

70. In a calculating machine, the combination of a register embodying number bearing members, a set of gears for imparting rotation to the said number bearing members, a traveling carriage, a supporting structure mounted thereon and for relative pivotal movement, an actuating gear supported by the structure and adapted to be advanced therewith to successively operate the first said gears, toothed members pivotally mounted upon the said structure and adapted to be advanced with the actuating gear to successively engage the first said gears to be rocked thereby, a plurality of members individual to the toothed members and pivotally mounted upon the said supporting structure, the last said members having loose connections with the respective toothed members, and means coöperating with the second said members for rocking the said supporting structure about its pivot to move the actuating gear and toothed members away from the first said gears in a direction transverse to the axis of the actuating gear and toothed members, the second said members being each provided with a cam face with which the said means coöperates for limiting the pivotal movement of the said toothed members relative to the supporting structure.

71. In a calculating machine, the combination with a register embodying number bearing members, a set of gears for actuating the said number bearing members, a traveling carriage, a supporting structure thereon and mounted for relative pivotal movement, an actuating gear mounted on the structure for advancement therewith successively to the first said gears, toothed members also pivotally mounted on the said structure and adapted to be advanced successively to the first said gears, members individual to the toothed members and pivotally mounted upon the said structure, one end of said members having loose connections with the respective toothed members, means associated with the second said members and having connection therewith for rocking the supporting structure to move the actuating gear and toothed members away from the first said gears in a direction transverse to the axis of said gear and members, and a cam face on each of the second said members with which the said means coöperates for controlling the pivotal movements of said toothed members.

72. In a calculating machine, the combination with a register embodying number bearing members, a set of gears for actuating the said number bearing members, a traveling carriage, a supporting structure thereon and mounted for relative pivotal movement, an actuating gear mounted on the structure for advancement therewith successively to the first said gears, toothed members also pivotally mounted on the said structure and adapted to be advanced successively to the first said gears, members individual to the toothed members and pivotally mounted upon the said structure, one end of said members having loose connections with the respective toothed members, means associated with the second said members and having connection therewith for rocking the supporting structure to move the actuating gear and toothed members away from the first said gears in a direction transverse to the axis of said gear and members, and to which all of said mechanism is relatively movable, and a cam face on each of the second said members with which the said means coöperates for controlling the pivotal movements of said toothed members.

73. In a calculating machine, the combination of a register embodying number bearing members, a set of gears for actuating the said number bearing members, a traveling carriage, a supporting structure mounted thereon for relative pivotal movement, an actuating gear mounted on the structure and adapted to be advanced successively to the first said gears, toothed members pivotally mounted on the structure and adapted to be advanced with the actuating gear successively to the first said gears, arms individual to the toothed members and pivotally mounted intermediate their ends on the said supporting structure, said arms having one end loosely connected with the respective toothed members, the free ends of the arms being provided with sockets, and means extending through the sockets for controlling the pivotal movements of said toothed members and adapted to engage the wall of the sockets for shifting the said supporting structure about its pivot to move the actuating gear and toothed members toward and away from the first said gears and in directions transverse to the axis of said gear and members.

74. In a calculating machine, the combination of a register embodying number bearing members, a set of gears for actuating the number bearing members, a traveling carriage, a supporting structure mounted thereon for relative pivotal movement, an actuating gear mounted on the structure and adapted to be advanced successively to the first said gears, toothed members pivotally mounted on the structure and adapted to be advanced with the actuating gear successively to the first said gears, arms individual to the toothed members and pivotally mounted intermediate their ends on the said supporting structure, said arms having one end loosely connected with the respective toothed members, the free ends of the arms being provided with sockets, and means extending through the sockets for controlling the pivotal movements of the toothed members and adapted to engage the wall of the sockets for shifting the said supporting structure about its pivot to move the actuating gear and toothed members toward and away from the first said gears and in directions transverse to the axis of said gear and members, and with respect to which means the carriage and the structure supported thereby are relatively movable.

75. In a calculating machine, the combination of a register embodying number bearing members, a set of gears for rotating the number bearing members, a traveling carriage, a supporting structure mounted thereon for relative movement, an actuating gear on the structure adapted to be advanced thereby successively to the first said gears, a toothed member pivotally mounted on the structure and adapted to be advanced successively to the first said gear, an arm pivotally supported on the structure, said arm having a loose connection with said toothed member comprising a socket, one wall of the socket being provided with a cam surface, another wall being provided with a reduced portion, a member extending into the socket, and means for shifting the member into the reduced portion of the socket to move the supporting structure to shift the actuating gear and toothed member away from the first said gears and the toothed member relative to the structure, and for also moving the said member into engagement with the cam face to move the supporting structure toward the first said gears and for controlling the movement of the toothed member in the opposite direction relative to the said supporting structure.

76. In a calculating machine, the combination of a register embodying number bearing members, a set of gears for rotating the number bearing members, a traveling carriage, a supporting structure mounted thereon for relative movement, an actuating gear on the structure adapted to be advanced thereby successively to the first said gears, a toothed member pivotally mounted on the structure and adapted to be advanced successively to the first said gear, an arm pivotally supported on the structure, said arm having a loose connection with said toothed member being provided with a socket, one wall of the socket comprising a cam surface, another wall being provided with a reduced portion, a member extending into the socket and with relation to which the carriage and the supporting structure are adapted for advancing movement relative thereto, and means for shifting the member into the reduced portion of the socket to move the supporting structure to shift the actuating gear and toothed member away from the first said gears and the toothed member relative to the structure, and for also moving the said member into engagement with the cam face to move the supporting structure toward the first said gears and for controlling the movement of the toothed member in the opposite direction relative to the said supporting structure.

77. The combination of a plurality of registers, actuating mechanisms individual to the registers and movable relatively thereto, selector mechanisms individual to the actuating mechanisms, and selector mechanisms which may drive any of said actuating mechanisms and to which the actuating mechanisms and the first said selector mechanisms are relatively movable.

78. The combination of a plurality of registers, actuating mechanisms individual to the registers and movable relatively thereto, selector mechanisms individual to the actuating mechanisms and movable therewith, keys for controlling the selector mechanisms and to which the selector mechanisms are relatively movable, and additional selector mechanisms which may drive any of said actuating mechanisms, and to which the actuating mechanisms and the first recited selector mechanisms are relatively movable.

79. In a calculating machine, the combination of a plurality of registers, a support for the registers, and actuating mechanisms for the registers movable relatively to the registers, said registers being mounted for detachment from the support in a direction toward the actuating mechanism and being prevented from detachment by said mechanism, said support being mounted for adjustment to swing the registers away from the actuating mechanism to permit one or more of the registers to be removed from the support.

80. In a calculating machine the combination of a plurality of registers, a support for the registers, and actuating mechanism for the registers movable relatively to the registers, said registers being mounted for detachment from the support in a direction toward the actuating mechanism and being prevented from detachment by said mechanism, said support being mounted for adjustment on a horizontal pivot to swing the registers away from the actuating mechanism to permit one or more of the registers to be removed from the support.

81. A calculating machine comprising, in combination, a plurality of totalizers arranged end for end in longitudinal alinement, a computing carriage movable longitudinally therewith, a shaft mounted upon said carriage, a plurality of master wheels mounted upon said shaft, said totalizers having gears with which said master wheels may mesh, means for normally holding said master wheels out of alinement with said gears, means for releasing any one of said master wheels to render the same active and bring it into engagement with said gears, means for rocking said shaft so as to throw the active master wheel in or out of mesh with said gear wheels, and means for rotating said shaft different amounts to correspond with the digit being added.

82. In a calculating machine, in combination, a plurality of totalizers having gear wheels, said totalizers being arranged end for end in longitudinal alinement, a shaft extending longitudinally therewith, a plurality of master wheels carried by said shaft, means for controlling said master wheels to enable any of said master wheels to mesh with the gears of its corresponding totalizer, a carriage supporting said shaft, means for advancing said carriage, a driving gear wheel on the end of said shaft, an elongated drum having teeth meshing with said last driving gear wheel, key-controlled means for rotating said drum different amounts to correspond with the digit being added, and means for rocking said shaft to throw said master wheels in and out of mesh with the gears of said totalizers.

83. In a calculating machine, in combination, a plurality of totalizers disposed end for end in axial alinement, a shaft extending longitudinally therewith, said totalizers having a plurality of gear wheels corresponding to the different denominations, a plurality of master wheels mounted on said shaft corresponding to said totalizers, means for normally holding said master wheels out of alinement with the gears of said totalizers, means for releasing said master wheels to throw the same into active engagement with said totalizers individually, means for withdrawing all of said master wheels from engagement with their totalizers, and resetting the same out of alinement with the gears thereof, means for rocking said shaft toward and away from said totalizers, means for advancing said carriage, and key-controlled means for rotating said shaft different amounts corresponding to the digit added.

84. In a calculating machine, in combination, a plurality of totalizers disposed end for end and having a plurality of gear wheels, a shaft extending longitudinally therewith, a plurality of master wheels mounted on said shaft, means for normally holding said master wheels out of alinement with the gears of said totalizers, said master wheels being adapted for release individually, means for advancing said master wheels longitudinally of said shaft when released to bring the same into alinement with the gears of said totalizers, means for advancing said carriage, means for rocking said shaft to bring said master wheels toward or away from said totalizers, and key-controlled means for rotating said shaft different amounts.

85. In a calculating machine, in combination, a plurality of totalizers disposed end for end and having a plurality of gear wheels, a carriage movable longitudinally therewith, master wheels mounted on said carriage and adapted to drive said gear wheels, means for normally holding said master wheels inactive, means for rendering any one of said master wheels active to coöperate with the totalizer corresponding thereto, a shaft for driving said master wheels, and key-controlled means for rotating said shaft different amounts.

86. In a calculating machine, in combination, a plurality of totalizers disposed end for end in longitudinal alinement, said totalizers having a plurality of gear wheels, a carriage moving longitudinally with said totalizers, a shaft mounted on said carriage, a plurality of master wheels mounted on said shaft for coöperating respectively with said totalizers, depressible stems for controlling the activity of said master wheels, depressible keys having elongated frames in connection therewith, said frames being connected with said stems, and maintaining connection between said keys and said stems during the movements of said carriage, and means for rotating said shaft different amounts.

87. In a calculating machine, in combination, a driven shaft, a computing mechanism actuated thereby, a second shaft opposite to said first shaft, a plurality of segments carried thereby for driving said first shaft different amounts, keys for controlling the activity of said segments, cams also controlled by said keys and rotating with said second shaft, and means for printing the number corresponding to the key depressed, actuated by said cams.

88. In a calculating machine, in combination, a driven shaft, computing mechanism actuated thereby, a plurality of gear wheels mounted on said driven shaft, a segment shaft, a plurality of segments mounted to rotate therewith and adapted to slide into and out of alinement with said gear wheels, keys for controlling the position of said segments, means for rotating said segment shaft, cams in connection with said segments, a typewriter having number keys, and means for actuating said number keys from said cams.

89. In a calculating machine, in combination, a totalizer, a shaft having a plurality of segments, keys for connecting said segments to said totalizer to drive the same, a motor, an escapement normally holding said motor in check, said keys being adapted to actuate said escapement to release said motor, said escapement being adapted to check said motor automatically.

90. In a calculating machine, in combination, a totalizer, a shaft having a plurality of segments, depressible keys for connecting said segments to said totalizer to drive the same, a motor, an escapement normally holding said motor in check, said keys being adapted to actuate said escapement to release said motor, said escapement being adapted to check said motor automatically, and means actuated by the motor for locking the depressed key against return.

91. In a calculating machine, in combination a totalizer having a plurality of gears corresponding to the different denominations, a master wheel opposite to said gears, means for advancing said master wheel longitudinally along said totalizer, so that it may mesh with said gears, means for swinging said master wheel laterally into and out of mesh with said gears, means for rotating said master wheel to actuate said totalizer, and means associated with said master wheel for locking the wheels of higher denomination against overthrow.

92. In a calculating machine, in combination, a totalizer having a plurality of gear wheels corresponding to the different denominations, a master wheel opposite to said gear wheels, means for advancing said master wheel longitudinally along said totalizer, so that it may mesh with said gear wheels, means for swinging said master wheel laterally into and out of mesh with said gear wheels, means for rotating said master wheel to actuate said totalizer, segments pivotally mounted adjacent to said master wheels and adapted to engage the gears of higher denomination, and means for limiting the movement of said segments to prevent an overthrow of the wheels of higher denomination in the adding movement.

93. In a calculating machine, in combination, a totalizer having a plurality of gears corresponding to the different denominations, a rocking frame, a master wheel mounted on said rocking frame, means for advancing said master wheel longitudinally of said totalizer, means for swinging said rocking frame to bring said master wheel into and out of mesh with said gears, segments pivotally mounted adjacent to said master wheel and adapted to mesh with the gear wheels of higher denomination, an arm mounted on said rocking frame having a pin-and-slot connection with said segment, and limiting the movement of said segments to prevent overthrow in the carrying movement, and means for rotating said master wheels different amounts to actuate said totalizer.

94. In a calculating machine, in combination, a totalizer having a plurality of gear wheels corresponding to the different denominations, a rocking frame disposed opposite thereto, a master wheel mounted on said rocking frame, means for advancing said master wheel longitudinally of said totalizer, a segment pivotally mounted adjacent to said master wheel and adapted to mesh with the gear of next higher denomination when said master wheel is in engagement with one of said gears, arms pivotally mounted on said rocking frame and having a pin-and-slot connection with said segment, a bar engaging said arms, said arms having a limited swinging movement with respect to said bar, means for swinging said arm laterally so as to rock said rocking frame, and means for rotating said master wheel to actuate said totalizer.

95. In a calculating machine, in combination, a totalizer having a plurality of gears corresponding to different denominations, a depressed pivot shaft parallel with the axis of said totalizer, a rocking frame mounted on said pivot shaft, an upper shaft mounted on said rocking frame, a master wheel mounted on said upper shaft and adapted to mesh successively with said gears, means for swinging said rocking frame to bring said master wheel into and out of mesh with said gears, and a gear wheel on said pivot shaft for driving said upper shaft to actuate said totalizer when said master wheel is in mesh with one of said gears.

96. In a calculating machine, the combination of a plurality of registers, a support for the registers, actuating mechanism for the registers movable relatively to the registers, said registers being mounted for detachment from the support in a direction toward the actuating mechanism and being prevented from detachment by said mechanism, said support being mounted for adjustment on a horizontal pivot to swing the registers away from the actuating mechanism to permit one or more of the registers to be removed from the support, and means for retaining the support in any of its adjusted positions.

97. In a calculating machine, the combination of a plurality of registers, a support for the registers, actuating mechanism for the registers movable relatively to the registers, said registers being mounted for detachment from the support in a direction toward the actuating mechanism and being prevented from detachment by said mechanism, said support being mounted for adjustment on a horizontal pivot to swing the registers away from the actuating mechanism to permit one or more of the registers to be removed from the support, and yielding means for retaining the support in any of its adjusted positions.

98. The combination with a register, of actuating means for said register, restraining means normally holding said actuating means out of effective coöperation with said register, potential means normally tending to render said actuating means effective, and means for releasing said restraining means to enable said potential means to act.

99. The combination with a register, of actuating means for said register, restraining means normally holding said actuating means out of effective coöperation with said register, potential means normally tending to render said actuating means effective, means for releasing said restraining means to enable said potential means to act, and means for concomitantly rendering said actuating means ineffective and rendering said potential means once more potential.

100. The combination with a register, of actuating means for said register, said actuating means being normally ineffective, potential means tending normally to render said actuating means effective, and restraining means for preventing the action of said potential means.

101. The combination with a register, of actuating means for said register, restraining means normally holding said actuating means out of effective coöperation with said register, a spring tending normally to draw said actuating means into effective relation with said register, and means for releasing said restraining means to enable said spring to draw said actuating means into effective relation with said register.

102. The combination with a register, of actuating means for said register, restraining means normally holding said actuating means out of effective coöperation with said register, a spring tending normally to draw said actuating means into effective relation with said register, means for releasing said restraining means to enable said spring to draw said actuating means into effective relation with said register, and means for concomitantly shifting said actuating means out of coöperaton with said register and imparting to said spring a tension tending to bring said actuating means in coöperation with said register.

103. The combination with a register, of actuating means for said register, a spring normally tending to manipulate said actuating means into coöperative relation with said register, locking means for holding said actuating means against the tension of said spring out of coöperative relation with said register, and a key for releasing said locking means.

104. The combination with a register, of traveling actuating means for said register, a key for controlling the effective relation of said actuating means with said register, and connections between said traveling means and said key, whereby said key can render said traveling actuating means effective at any point in the movement thereof.

105. The combination with a computing register, of actuating mechanism for said register, means for determining the active and inactive periods of said register by adjusting said actuating mechanism, means for feeding said actuating mechanism step-by-step into coöperation with successive parts of said register, and means for moving said actuating mechanism out of contact with said register between the step-by-step movements.

106. The combination with a computing register, of actuating mechanism for said register having a rotary movement, a step-by-step movement, and a vibratory movement.

107. The combination with a computing register, of actuating mechanism for said register having a rotary movement, a step-by-step movement, and a vibratory movement, and means for determining the stopping point of a certain part of said actuating mechanism to determine the effective and ineffective periods thereof.

108. The combination with a register, of actuating mechanism for said register having a master wheel capable of assuming two different positions relative to the remainder of said actuating mechanism, which positions control the effective and ineffective periods of said actuating mechanism to operate said register, a series of numeral keys, and numeral key-controlled means for rotating said master wheel irrespective of whether it is in its effective or ineffective position.

109. The combination with a register, of actuating mechanism for said register having a master wheel capable of assuming two different positions relative to the remainder of said actuating mechanism, which positions control the effective and ineffective periods of said actuating mechanism to operate said register, a series of numeral keys, numeral key-controlled means for rotating said master wheel irrespective of whether it is in its effective or ineffective position, and means for moving said master wheel step-by-step to different positions relative to said register irrespective of whether said master wheel is in its effective or ineffective relation.

110. The combination with a register having denominational elements corresponding to units, tens, etc., of actuating mechanism for said register including a master wheel and tens carrying members capable of overlapping the adjacent denominational elements of said register solely of a higher denomination than that with which said master wheel is in coöperation, means for moving said master wheel and said tens carrying members in unison step-by-step, and means for moving said master wheel relative to said tens carrying members to control the effective and ineffective periods of said actuating mechanism.

111. The combination with a computing mechanism, of a series of numeral keys, means controlled by said numeral keys for operating said computing mechanism, a motor for actuating said means, a supplementary motor, and mechanism for supplying potential energy to said first-mentioned motor from said second-mentioned motor after a predetermined actuation of said means by said first-mentioned motor.

112. The combination with two primary elements, to wit, a totalizer, having a series of computing members, and a master member for said totalizer, of means for giving one of said elements a longitudinal movement to effect denominational selection of said computing members, a movement to cause said primary elements to assume engaging and disengaging positions, and a movement to render the totalizer effective when the primary elements are in engaging position.

113. The combination with two primary elements, to wit, a series of totalizers, each having a series of computing members, and a series of master members, one master member for each of said totalizers, of a carriage forming a support for one of said primary elements, means for giving one of said elements a longitudinal movement to effect denominational selection of said computing members, and a movement to cause engagement and disengagement of said primary elements, and means for selecting any one or more totalizers for activity during the engagement of said primary elements.

114. The combination with a series of totalizers, each having a series of computing wheels, of a series of master wheels, one individual to each of said totalizers, united to rotate in unison and further united to travel in unison step by step relatively to the wheels of said totalizers, a carriage forming a movable support for said master wheels, means for moving said master wheels as a set bodily toward and from their respective totalizers, said master wheels normally moving to a position out of register with the computing wheels, and selecting means individual to each master wheel for controlling the register of each master wheel with the computing wheels, and thus determining the effectiveness of each master wheel irrespective of the effectiveness of every other master wheel.

115. The combination with a series of totalizers, each having a series of computing wheels, of a series of master wheels, one individual to each of said totalizers, a shaft common to all of said master wheels for rotating them in unison, said master wheels being splined on said shaft, so as to rotate therewith and yet be capable of sliding relatively to said shaft, each of said master wheels being normally located out of register with the wheels of its associated totalizer, and individual shifting means for each of said master wheels for sliding the same along said shaft to bring said master wheels individually and separately into register with the computing wheels of the associated totalizer.

116. The combination with a totalizer having a series of computing wheels, of a master wheel for rotating said computing wheels *seriatim*, said master wheel being normally out of effective register with said computing wheels, a key controlling the effective register of said master wheel with said computing wheels, so that said master wheel may run-up numbers on said computing wheel a shaft for said master wheel, a valuating shaft, driving connections between said valuating shaft and said master wheel shaft, a series of gears on said valuating shaft, a series of mutilated gears graded in number of their teeth so as to correspond to digits for "1" to "9", a shaft for driving said mutilated gears, said mutilated gears being normally out of registering planes with said gears on said valuating shaft, means for rotating all of said mutilated gears, and keys individual to each of said mutilated gears for shifting the same into register with the associated gears on the valuating shaft.

117. The combination with a series of totalizers, each having a series of computing members, of a series of master members, one master member for each of said totalizers, all of said master members being mounted for simultaneous longitudinal movement to effect denominational selection of the computing members of their respective totalizers, and for simultaneous movement to and from engaging relations with their respective totalizers, and means individual to each totalizer for determining the activity of any particular totalizer during said denominational movement and during the time the totalizer and master member are in engaging relation.

118. The combination with computing mechanism having a traveling element to determine denominational selection, said element being normally inactive, of a key controlling the activity of said traveling element during denominational selection, said key being stationary, and a universal connection between said key and said traveling element, enabling said stationary key to control the activity of said traveling element in any denominational position of the latter.

119. The combination with a traveling typewriter carriage, of computing mechanism including registering mechanism and traveling actuating mechanism for said registering mechanism, means for controlling the traveling movement of said actuating mechanism from said carriage, and means for controlling the return movements of said carriage from said computing mechanism.

120. The combination with a traveling carriage advancing step by step for a plurality of computing zones or columns, of computing mechanism including a registering mechanism, traveling actuating mechanism for said registering mechanism, and valuating mechanism for said actuating mechanism, means for repeatedly advancing and returning said actuating mechanism for each computing zone or column as determined by said carriage during the traveling movement of said carriage continuously in an advancing direction and controlling such movements of said carriage, and means for controlling from said computing mechanism, traveling movements of said carriage.

121. The combination with a traveling carriage advancing step by step for a plurality of computing zones or columns, of computing mechanism including a registering mechanism, traveling actuating mechanism for said registering mechanism, and valuating mechanism for said actuating mechanism, means for repeatedly advancing and returning said actuating mechanism for each computing zone or column as determined by said carriage during the traveling movements of said carriage continuously in an advancing direction and controlling such movements of said carriage, and supplementary means to said valuating mechanism for returning said carriage from any point in its advancement.

122. The combination with a totalizer including a plurality of aliquotly spaced computing wheels, with driving gears for each computing wheel, of a master wheel moving step by step past said gears an amount corresponding to the spacing of said computing wheels, said master wheel being adjustable so that during its step-by-step movements it can move either in register with the spaces between said gears, or in register with the gears themselves to determine the inactive and active positions of said master wheel, and means for adjusting said master wheel between active and inactive positions.

123. The combination with a series of computing wheels, of a master wheel for driving said computing wheels *seriatim*, a series of tens-carrying segments aliquotly spaced, and means for varying the relative position of said master wheel with respect to said computing wheels and said tens-carrying segments, to determine the activity of said master wheel, said master wheel and said tens-carrying segments having a concomitant step-by-step movement past said computing wheels.

In testimony whereof I have signed my name to this specification, in the presence of two subscribing witnesses, on this 23rd day of February, A. D. 1910.

SAMUEL E. CARLIN.

Witnesses:
J. H. JOCHUM, Jr.,
A. O. KNIGHT.